(12) United States Patent
Coaplen et al.

(10) Patent No.: US 12,410,868 B2
(45) Date of Patent: Sep. 9, 2025

(54) ROTARY FLOW CONTROL VALVE THAT REQUIRES NO LINEAR MOTION

(71) Applicant: Fox Factory, Inc., Duluth, GA (US)

(72) Inventors: Joshua Coaplen, Asheville, NC (US); William O. Brown, IV, Aptos, CA (US); Thomas Pollock, Fletcher, NC (US); Christopher Otterness, Asheville, NC (US)

(73) Assignee: Fox Factory, Inc., Duluth, GA (US)

( * ) Notice: Subject to any disclaimer, the term of this patent is extended or adjusted under 35 U.S.C. 154(b) by 124 days.

(21) Appl. No.: 17/591,392

(22) Filed: Feb. 2, 2022

(65) Prior Publication Data
US 2022/0252163 A1  Aug. 11, 2022

Related U.S. Application Data

(60) Provisional application No. 63/146,399, filed on Feb. 5, 2021.

(51) Int. Cl.
*F16K 5/04* (2006.01)
*B62J 1/02* (2006.01)
*F16K 17/18* (2006.01)
*F16K 31/04* (2006.01)

(52) U.S. Cl.
CPC ............... *F16K 5/0442* (2013.01); *B62J 1/02* (2013.01); *F16K 5/0414* (2013.01); *F16K 17/18* (2013.01); *F16K 31/041* (2013.01)

(58) Field of Classification Search
CPC ...... F16K 5/0442; F16K 5/0414; F16K 17/18; F16K 31/055; F16K 31/041–045; F16K 5/061; F16K 5/184; B62J 1/02–065; B62J 2001/085

USPC ......... 251/129.11–129.13, 89–116, 286–288, 251/292, 304–317.1
See application file for complete search history.

(56) References Cited

U.S. PATENT DOCUMENTS

| | | | | |
|---|---|---|---|---|
| 1,638,152 A | * | 8/1927 | Gabriel | F16K 5/0207 251/183 |
| 1,840,498 A | * | 1/1932 | Froussard | F16K 5/184 251/312 |
| 2,246,801 A | * | 6/1941 | Harrington | F16K 5/184 251/182 |
| 2,314,512 A | * | 3/1943 | Parker | F16K 5/184 251/297 |

(Continued)

FOREIGN PATENT DOCUMENTS

| | | |
|---|---|---|
| EP | 2657113 A2 | 10/2013 |
| EP | 4040024 A1 | 8/2022 |

(Continued)

OTHER PUBLICATIONS

European Search Report for EP Application No. 2215593.6, 10 pages, Mailed Jun. 30, 2022 No. 2215393.6.

(Continued)

*Primary Examiner* — Craig J Price

(57) ABSTRACT

A rotary flow control valve that requires no linear motion is disclosed. The rotary flow control valve comprises a drive mechanism and a rotary flow control valve coupled with the drive mechanism, wherein the rotary flow control valve is rotated by the drive mechanism without requiring conversion of a linear motion to a rotational motion.

4 Claims, 23 Drawing Sheets

(56) References Cited

U.S. PATENT DOCUMENTS

| | | | | |
|---|---|---|---|---|
| 2,371,657 A * | 3/1945 | Stark | F16K 11/085 | 251/297 |
| 2,383,549 A * | 8/1945 | Hilker | F16K 5/162 | 74/22 R |
| 2,506,097 A * | 5/1950 | Melichar | F16K 5/0414 | 251/297 |
| 2,523,825 A * | 9/1950 | Hartley | F16K 31/055 | 200/51 R |
| 2,556,668 A * | 6/1951 | Williams | F16K 5/0414 | 251/297 |
| 2,848,904 A * | 8/1958 | Wilson | F16K 31/055 | 74/625 |
| 2,893,430 A * | 7/1959 | Holl | F16K 3/04 | 137/625.42 |
| 3,012,752 A * | 12/1961 | Buck | F16K 5/0414 | D24/129 |
| 3,028,964 A * | 4/1962 | Reynolds | F16K 11/0836 | 210/140 |
| 3,133,723 A * | 5/1964 | Goldman | F16K 5/0478 | 251/309 |
| 3,212,752 A * | 10/1965 | Kast | F16K 5/0414 | 251/185 |
| 3,254,872 A * | 6/1966 | Roos | F16K 5/184 | 29/890.128 |
| 3,314,643 A * | 4/1967 | Sachnik | F16K 5/0407 | 251/317 |
| 3,406,943 A * | 10/1968 | Newell | F16K 5/00 | 251/312 |
| 3,674,235 A * | 7/1972 | Porter | F16K 27/00 | 251/162 |
| 3,746,302 A * | 7/1973 | Larsen | F16K 5/185 | 251/188 |
| 3,776,507 A * | 12/1973 | Tomlin | F16K 31/54 | 251/248 |
| 3,819,117 A * | 6/1974 | Moorhead, Jr. | F02K 9/80 | 251/309 |
| 4,015,816 A * | 4/1977 | Semon | F16K 5/0478 | 251/192 |
| 4,132,388 A * | 1/1979 | Billeter | F16K 5/0478 | 251/312 |
| 4,146,055 A * | 3/1979 | Ryder | F16K 11/085 | 251/312 |
| 4,173,328 A * | 11/1979 | Karbo | F16K 5/0435 | 251/317 |
| 4,262,880 A * | 4/1981 | Danko | F16K 5/12 | 251/317 |
| 4,319,735 A * | 3/1982 | Moen | F16K 5/0428 | 251/317 |
| 4,511,120 A * | 4/1985 | Conley | F16K 5/045 | 251/312 |
| 4,557,464 A * | 12/1985 | Gyurovits | F16K 3/08 | 251/312 |
| 4,611,626 A * | 9/1986 | Logsdon | F16K 11/22 | 4/675 |
| 4,647,010 A | 3/1987 | Sogabe et al. | | |
| 4,744,390 A * | 5/1988 | Henry | F16K 5/0292 | 294/1.3 |
| 4,789,000 A * | 12/1988 | Aslanian | A61M 5/16881 | 604/32 |
| 4,844,110 A * | 7/1989 | Paley | F16K 31/046 | 137/1 |
| 4,881,718 A * | 11/1989 | Champagne | F16K 5/0605 | 251/316 |
| 5,046,528 A * | 9/1991 | Manska | F16K 31/602 | 251/304 |
| 5,108,075 A * | 4/1992 | Downard | F16K 5/10 | 251/312 |
| 5,131,623 A * | 7/1992 | Giordani | F16K 31/045 | 251/129.11 |
| 5,149,054 A * | 9/1992 | Passerell | F16K 27/06 | 251/309 |
| 5,174,546 A * | 12/1992 | Giordani | F16K 31/045 | 251/129.11 |
| 5,188,144 A * | 2/1993 | Radossi | F16K 27/065 | 251/317 |
| 5,205,534 A * | 4/1993 | Giordani | F16K 31/045 | 310/75 A |
| 5,234,193 A * | 8/1993 | Neal, Jr. | F16K 27/065 | 251/317 |
| 6,044,857 A * | 4/2000 | Stege | F16K 31/042 | 137/154 |
| 6,050,299 A * | 4/2000 | Abrams | D04B 35/22 | 137/625.11 |
| 6,070,852 A * | 6/2000 | McDonnell | F02D 11/107 | 251/249.5 |
| 6,090,206 A * | 7/2000 | Bang | F16K 5/12 | 251/309 |
| 6,095,488 A * | 8/2000 | Semeyn, Jr. | F02D 11/10 | 251/69 |
| 6,244,565 B1 * | 6/2001 | McDonnell | F02D 11/10 | 251/305 |
| 6,276,660 B1 * | 8/2001 | Wittkopp | F15B 13/042 | 251/59 |
| 6,575,427 B1 * | 6/2003 | Rauch | F02D 11/10 | 251/285 |
| 6,622,984 B2 * | 9/2003 | Rauch | F02D 11/10 | 251/71 |
| 7,182,314 B2 * | 2/2007 | Harvey | F16K 31/043 | 251/305 |
| 7,210,668 B2 * | 5/2007 | Wilfert | F16K 5/188 | 251/174 |
| 7,255,130 B2 * | 8/2007 | Martins | B60H 1/00485 | 137/625.46 |
| 7,429,029 B2 * | 9/2008 | Wang | B05B 1/3026 | 239/526 |
| 7,458,112 B1 * | 12/2008 | Yang | E03C 1/066 | 4/570 |
| 7,849,877 B2 * | 12/2010 | Tan | F16K 11/076 | 251/285 |
| 7,963,951 B2 * | 6/2011 | Kitani | A61M 39/223 | 137/625 |
| 8,459,895 B2 * | 6/2013 | Hayashi | F16D 3/68 | 403/345 |
| 8,757,205 B1 * | 6/2014 | Trent | F16K 5/12 | 251/283 |
| 8,838,335 B2 | 9/2014 | Bass et al. | | |
| 8,919,378 B2 * | 12/2014 | Bartnick | F16K 11/0856 | 251/317.01 |
| 8,950,693 B2 * | 2/2015 | Hsieh | F16K 27/065 | 251/312 |
| 9,010,722 B2 * | 4/2015 | Hoots | F16K 1/2007 | 70/180 |
| 9,103,448 B2 * | 8/2015 | Witkowski | B23P 15/001 | |
| 9,353,818 B2 | 5/2016 | Marking | | |
| 9,422,018 B2 | 8/2016 | Pelot et al. | | |
| 9,682,604 B2 | 6/2017 | Cox et al. | | |
| 9,797,467 B2 | 10/2017 | Wootten et al. | | |
| 9,897,216 B1 * | 2/2018 | Kuo | F16K 27/067 | |
| 9,958,082 B2 * | 5/2018 | Yu | F16K 31/041 | |
| 10,018,281 B2 * | 7/2018 | Yang | F16K 27/065 | |
| 10,036,443 B2 | 7/2018 | Galasso et al. | | |
| 10,301,050 B2 * | 5/2019 | Donati | F16K 5/0605 | |
| 10,415,662 B2 | 9/2019 | Marking | | |
| 10,975,974 B2 * | 4/2021 | Zhu | F16K 11/0853 | |
| 11,077,293 B2 * | 8/2021 | Liu | F16K 31/502 | |
| 11,112,015 B2 * | 9/2021 | Chapman | F16K 5/188 | |
| 11,156,298 B2 * | 10/2021 | Dalessio | B01L 3/567 | |
| 11,428,279 B2 * | 8/2022 | Choltco-Devlin | F16D 41/16 | |
| 11,796,027 B2 * | 10/2023 | Laird | F16F 9/44 | |
| 11,873,910 B2 * | 1/2024 | Kroczek | F16K 31/52466 | |
| 2003/0205685 A1 * | 11/2003 | Whang | F16K 5/10 | 251/315.16 |
| 2006/0027779 A1 * | 2/2006 | McGuire | F16K 5/0478 | 137/15.17 |
| 2006/0070672 A1 * | 4/2006 | Martins | B60H 1/00485 | 137/625.47 |
| 2007/0246678 A1 * | 10/2007 | Michaels | F16K 11/087 | 96/108 |

(56) References Cited

U.S. PATENT DOCUMENTS

| | | | |
|---|---|---|---|
| 2009/0065724 A1* | 3/2009 | Mitton | F16K 5/0414 |
| | | | 251/309 |
| 2009/0120519 A1* | 5/2009 | Chen | F16K 11/0853 |
| | | | 137/625.46 |
| 2010/0084595 A1* | 4/2010 | Kim | F16L 5/06 |
| | | | 251/304 |
| 2013/0075640 A1* | 3/2013 | Grossmann | F16K 31/535 |
| | | | 73/114.77 |
| 2013/0140475 A1* | 6/2013 | Burgess | F16K 31/043 |
| | | | 251/65 |
| 2013/0221713 A1 | 8/2013 | Pelot et al. | |
| 2015/0075658 A1* | 3/2015 | Tsuchiya | F16K 5/0407 |
| | | | 251/309 |
| 2018/0001953 A1 | 1/2018 | Winefordner et al. | |
| 2018/0245703 A1* | 8/2018 | Chen | F16K 11/0853 |
| 2019/0193802 A1* | 6/2019 | Hara | G08C 17/00 |
| 2021/0341076 A1* | 11/2021 | Martin | F16H 19/001 |

FOREIGN PATENT DOCUMENTS

| | | |
|---|---|---|
| TW | 501692 U | 9/2002 |
| TW | 201636257 A | 10/2016 |
| TW | M578670 U | 6/2019 |

OTHER PUBLICATIONS

First Office Action for Taiwan Application No. 111104413, 12 Pages, Mailed Jun. 7, 2023.
Third Office Action for Taiwan Application No. 111104413, 7 Pages, Mailed Jan. 9, 2025.

* cited by examiner

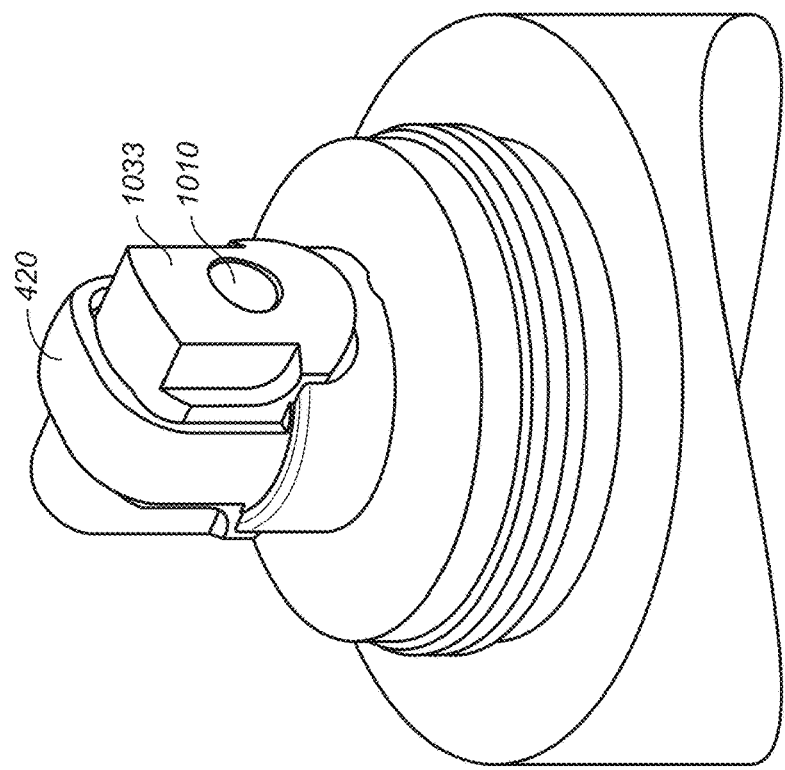
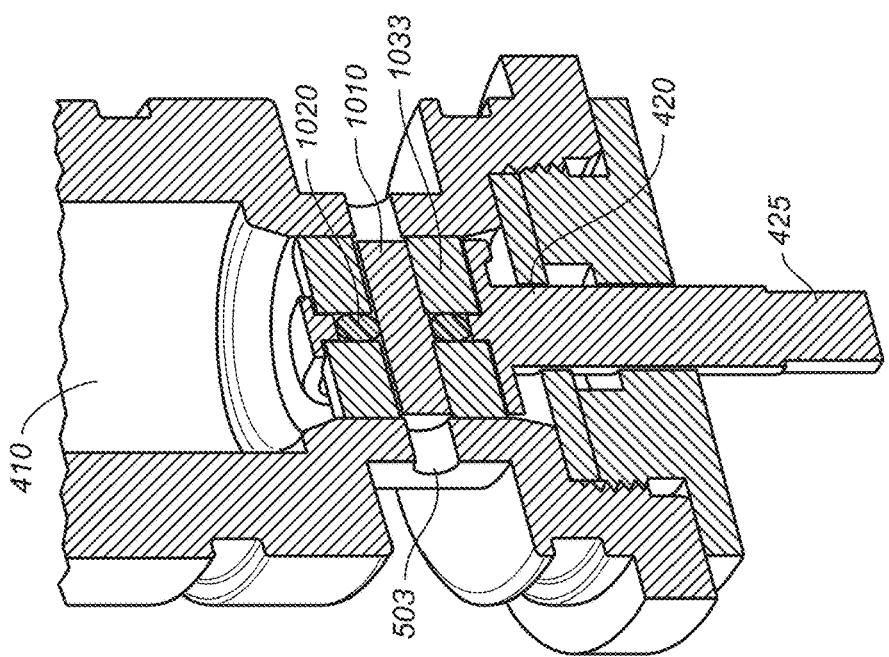
FIG. 10B
FIG. 10A

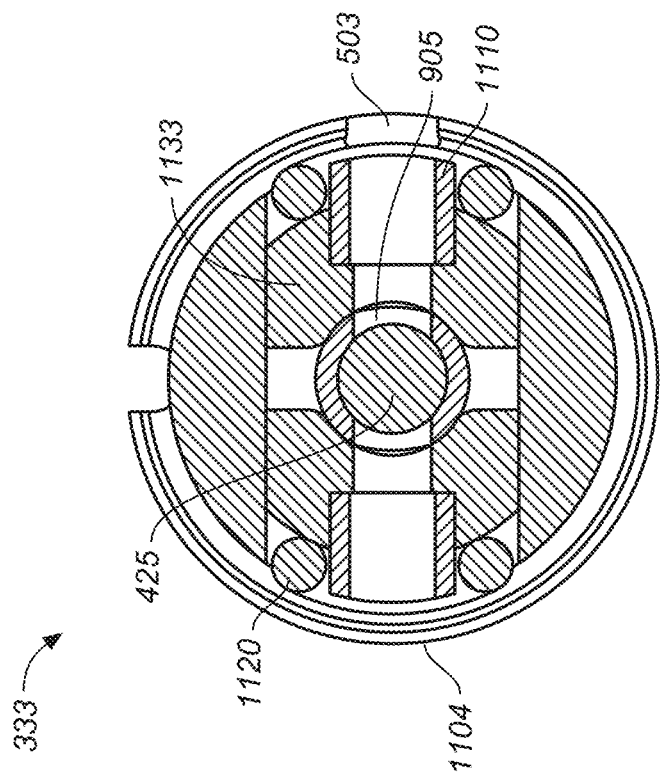
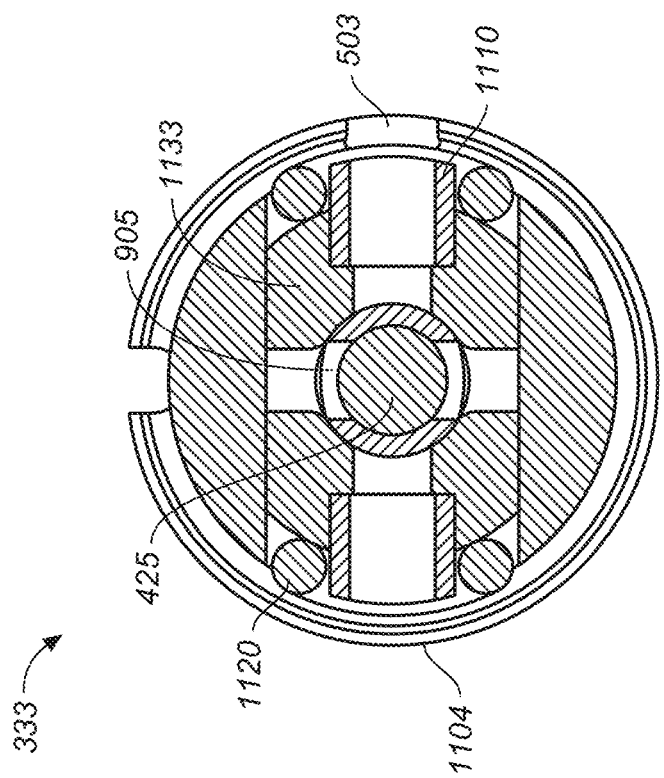

ROTARY FLOW CONTROL VALVE THAT REQUIRES NO LINEAR MOTION

CROSS-REFERENCE TO RELATED APPLICATIONS (PROVISIONAL)

This application claims priority to and benefit of U.S. Provisional Patent Application No. 63/146,399 filed on Feb. 5, 2021, entitled "Rotary Valve For Dropper Seatpost" by Joshua Coaplen et al., and assigned to the assignee of the present application, the disclosure of which is hereby incorporated by reference in its entirety.

FIELD OF THE INVENTION

Embodiments of the invention generally relate to systems and methods for actuating hydraulic flow states in a dropper seatpost.

BACKGROUND

Prior rigid seatpost designs have begun to be replaced with dropper seatpost assemblies. In a dropper seatpost assembly, the seatpost can be lowered or raised by a rider via a lever. When the rider operates the lever, the dropper seatpost will move the saddle from the riders set saddle height to a lowered position, e.g., moving the saddle down and out of the rider's way. The rider can then operate the lever again and the dropper seatpost will return the saddle to the riders previously established saddle height. Often, however, dropper seatpost assemblies can add undesired amounts of weight, complexity, and the like.

BRIEF DESCRIPTION OF THE DRAWINGS

Aspects of the present invention are illustrated by way of example, and not by way of limitation, in the accompanying drawings, wherein:

FIG. 10A is a cross-section view of the rotary flow control valve with a single O-ring configuration installed within the rotary flow control valve assembly, in accordance with an embodiment.

FIG. 10B is a perspective view of the rotary flow control valve with a single O-ring configuration of FIG. 10A, in accordance with an embodiment.

FIG. 12B is a top cross-section view of the rotary flow control valve assembly with a rotating drive shaft in the form of a cylindrical shaft configuration in a closed state, in accordance with an embodiment.

FIG. 12C is a top cross-section view of the rotary flow control valve assembly with a rotating drive shaft in the form of a cylindrical shaft configuration in an open state, in accordance with an embodiment.

Figure 1:
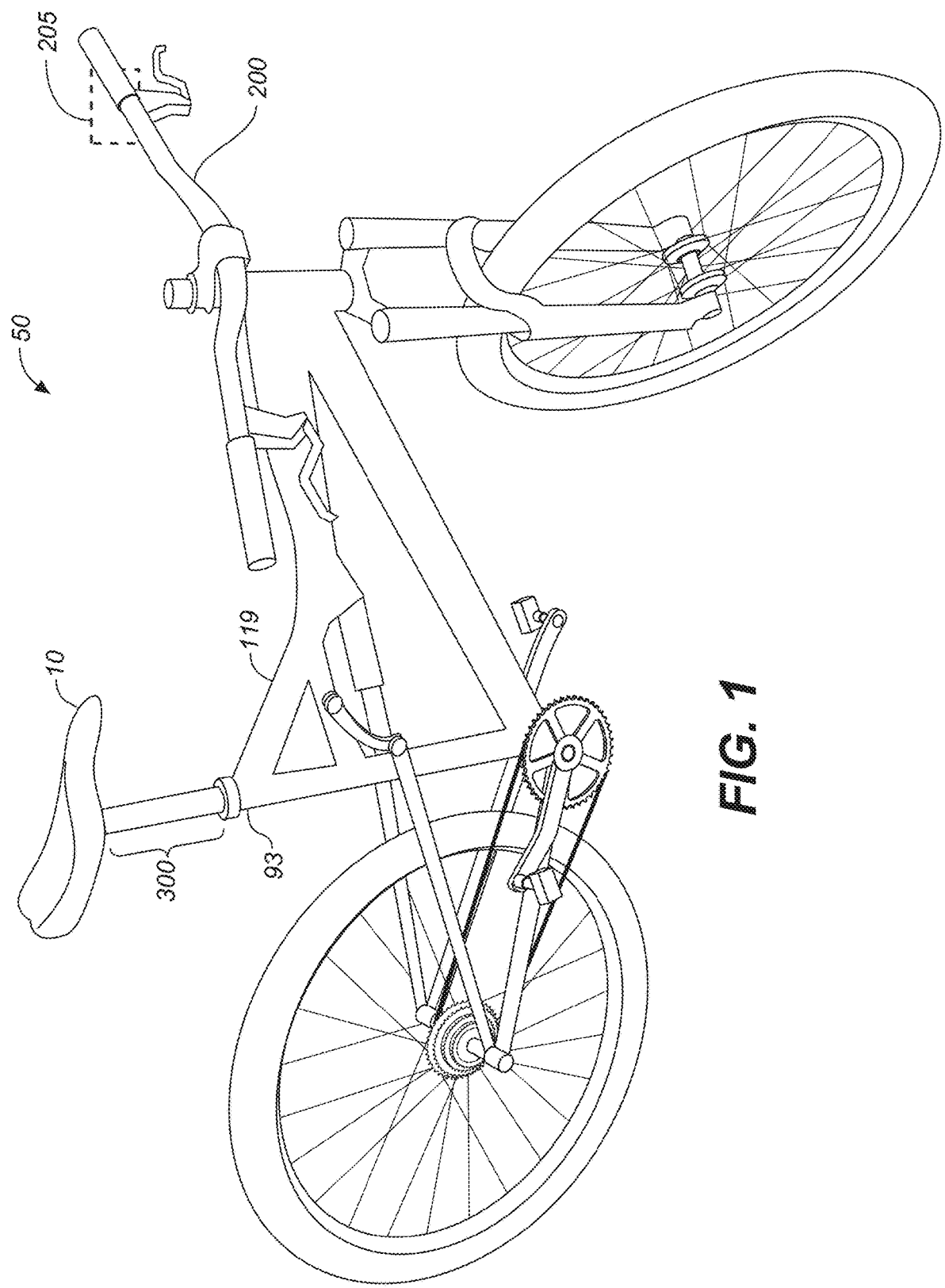
FIG. 1 is a perspective view of a bicycle, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Terminology

In the following discussion, a number of terms and directional language is utilized. Although the technology described herein is useful on a number of vehicles that have an adjustable saddle, a bicycle will be used to provide guidance for the terms and directional language.

In general, a bicycle has a front (e.g., the general location of the handlebars and the front wheel) and a rear (e.g., the general location of the rear wheel). For purposes of the discussion the front and rear of the bicycle can be considered to be in a first plane. A second plane that is perpendicular to the first plane would be similar to an exemplary flat plane of the ground upon which the bicycle is ridden.

The term "seat tube" refers to a portion of a bicycle frame to which a seatpost is attached (often by insertion of a portion of the seatpost into the seat tube).

A seatpost is a stand-alone component, e.g., a tube or other geometric shaped member, that couples a bicycle saddle with the bicycle frame via the seat tube. In one embodiment, the bottom of the seatpost is designed to be inserted into the seat tube of the bicycle frame and the top of the seatpost will include (or be coupled to) a saddle clamp assembly. The saddle clamp assembly is used to couple a bicycle saddle with the seatpost, in one embodiment, by clamping with the saddle rails.

In assembly, the seatpost (with or without the saddle attached thereto) is partially inserted into the seat tube of the bicycle frame. In general, a user adjusts the amount of seatpost sticking out of the seat tube to establish the vertical height of the saddle (e.g., how far the saddle is above the ground plane, above the pedals, etc.). Once the seatpost (with saddle) is adjusted within the seat tube to obtain the desired saddle height and orientation, a clamping member (or another retaining device) is used about the seat tube to fasten the seatpost within the seat tube.

The saddle clamp assembly allows a user to adjust the horizontal location of the saddle (e.g., toward the front or rear of the bicycle) and the pitch of the saddle (e.g., nose-up, nose-level, nose-down). In a standard seatpost, once the desired saddle height is established, the seatpost is clamped into position where it remains until it is unclamped. This singular saddle height capability is important to allow different riders to utilize similar components and merely adjust the saddle height. However, as a rider tackles different challenges, it is becoming clear that a rider-to-bicycle geometry changes depending upon the terrain being traversed. For example, on a level road, the rider would have a certain saddle to pedal distance. However, when going down a hill (or over rough terrain, if standing for additional leverage, etc.), the same rider would likely prefer a shorter saddle to pedal distance to allow the rider to lower their center of gravity, lean further forward or backward, use their legs to absorb bumps, and the like. As such, it is helpful to be able to adjust the saddle height during a ride.

A dropper seatpost assembly (hereinafter dropper seatpost) is a seatpost that includes a lower post, an upper post, and an actuator assembly. In the following discussion, the actuator assembly is a rotary flow control valve assembly.

In one embodiment, the lower post is a hollow or semi-hollow design. In one embodiment, the upper post is a hollow or semi-hollow design. In one embodiment, the lower post and the upper post are telescopically coupled such that the overall length of the dropper seatpost is modified by adjusting the telescoping extension and retraction.

In one embodiment, the telescoping extension and retraction capability of the upper and lower posts is controlled by the rotary flow control valve assembly. In one embodiment, the rotary flow control valve assembly is located in the lower post. In one embodiment, the rotary flow control valve assembly is located in the upper post. In one embodiment, the rotary flow control valve assembly could span the upper post and the lower post.

Overview

The following discussion discloses a rotary flow control valve assembly. In one embodiment, the rotary flow control valve assembly is an electronic rotary flow control valve assembly. In one embodiment, the rotary flow control valve assembly is a mechanically actuated rotary flow control valve assembly.

In one embodiment, the rotary flow control valve assembly includes a wired communication and actuation capability. For example, in one embodiment, the rotary flow control valve assembly is used as an actuator in a dropper seatpost assembly where the drop function is actuated via a wired connection between the rotary flow control valve assembly and a user interface.

In one embodiment, the rotary flow control valve assembly includes a wireless communication and actuation capability. For example, in one embodiment, the rotary flow control valve assembly is used as an actuator in a dropper seatpost assembly where the drop function is actuated via a wireless remote connection between the user interface and a motor used to rotate the rotary flow control valve of the rotary flow control valve assembly.

In one embodiment, the dropper seatpost doesn't move under electrical power, but instead, the rotational opening or closing of the rotary flow control valve assembly used in the dropper seatpost assembly is what receives the signal and utilizes the electrical power. The actual compression of the dropper seatpost assembly is caused by the rider's body weight on the saddle and the return of the dropper seatpost assembly is provided by a spring return force (or the like).

In one embodiment, using a communication protocol such as, but not limited to, those disclosed herein, the wirelessly actuated rotary flow control valve assembly used for the dropper seatpost assembly will respond to the remote input as fast or faster than a cable actuated dropper seatpost assembly. In other words, in one embodiment, the time lag, from the signal initiation by the rider using the wireless user interface until the wireless command is received and acted on by the electronic rotary flow control valve assembly causing the response in the dropper seatpost assembly, is smaller than a user perceptible delay.

In one embodiment, using a communication protocol such as, but not limited to, those disclosed herein, the wired actuated rotary flow control valve assembly used for the dropper seatpost assembly will respond to the input from the user interface as fast or faster than a cable actuated dropper seatpost assembly In one embodiment, the rotary flow control valve assembly uses small and light componentry with a focus on both the minimizing of power requirements resulting in a long battery life and the minimizing of the weight/rotational inertia of the rotary flow control valve assembly. In one embodiment, such as in a dropper seatpost assembly, the packaging envelope for the rotary flow control valve assembly should be smaller than the diameter of the seat tube within which the dropper seatpost assembly is to be installed.

In the following discussion, the operation of the rotary flow control valve assembly is provided in the context of a dropper seatpost assembly. However, in another embodiment, the rotary flow control valve assembly may be used in other active valve suspensions and components, to include other hydraulic applications such as a fork, shock, brake, etc. embodiments of different active valve suspension and components that may utilize the rotary flow control valve assembly are disclosed in U.S. Pat. Nos. 8,838,335; 9,353,818; 9,682,604; 9,797,467; 10,036,443; 10,415,662; the content of which are incorporated by reference herein, in their entirety.

In one embodiment, the rotary flow control valve assembly and dropper seatpost assembly could be used on one or more of a variety of vehicles such as, but not limited to, a bicycle, an electric bike (e-bike), a moped, or the like. In one embodiment, when the rotary flow control valve assembly is used in a component other than a dropper seatpost assembly, the rotary flow control valve assembly could be used on a plurality of different vehicles, components, and the like. However, in the following discussion, and for purposes of clarity, a bicycle is utilized as the example vehicle.

Operation

Referring now to FIG. 1, a perspective view of a bicycle 50 is shown in accordance with an embodiment. In general, the bicycle 50 includes pedals, wheels, a chain or other drive mechanism, brakes, an optional suspension, a saddle 10, a handlebars 200, a dropper seatpost assembly 300, a user interface 205, and a bicycle frame 119. In one embodiment, dropper seatpost assembly 300 is used to adjustably retain the saddle height and yaw position of saddle 10 with respect to bicycle frame 119.

In general, dropper seatpost assembly 300 includes an upper post, a lower post, and a rotary flow control valve assembly. The upper post and the lower post are telescopically coupled together to form the seatpost. In one embodiment, the upper post includes the saddle clamp assembly at a top thereof (e.g., at the end (or close to the end) of the upper post opposite the end of the upper post telescopically coupled with the lower post). In one embodiment, the lower post is inserted into and then fixedly coupleable with the seat tube 93 of bicycle frame 119.

In one embodiment, the rotary flow control valve assembly controls the telescoping capability of the upper post and lower post configuration, such that a user can operate a control lever (e.g., user interface 205 shown in FIG. 2) to "drop" the dropper seatpost assembly 300 to a lower setting (e.g., the saddle clamp assembly is approximately at the top of the lower post), and then use the same control lever to "return" the dropper seatpost assembly 300 to its preset ride height. This two-position capability allows a rider to have a preferred saddle ride height and also a lowered saddle height for traversing downhills, bumpy terrain, while standing on the pedals, or the like. Although two positions is discussed, the dropper seatpost assembly 300 could be adjustable to any number of different ride height positions, the use of two positions is discussed herein for purposes of clarity.

In one embodiment, the amount that dropper seatpost assembly 300 extending from the bicycle frame 119 can be adjusted. In general, dropper seatpost assembly 300 may be made of various materials, such as, but not limited to: steel, aluminum, titanium, carbon fiber, and aluminum wrapped in carbon fiber. Further discussion of dropper seatpost assembly 300 is provided herein to include the discussion of FIGS. 3A-B.

Figure 2:
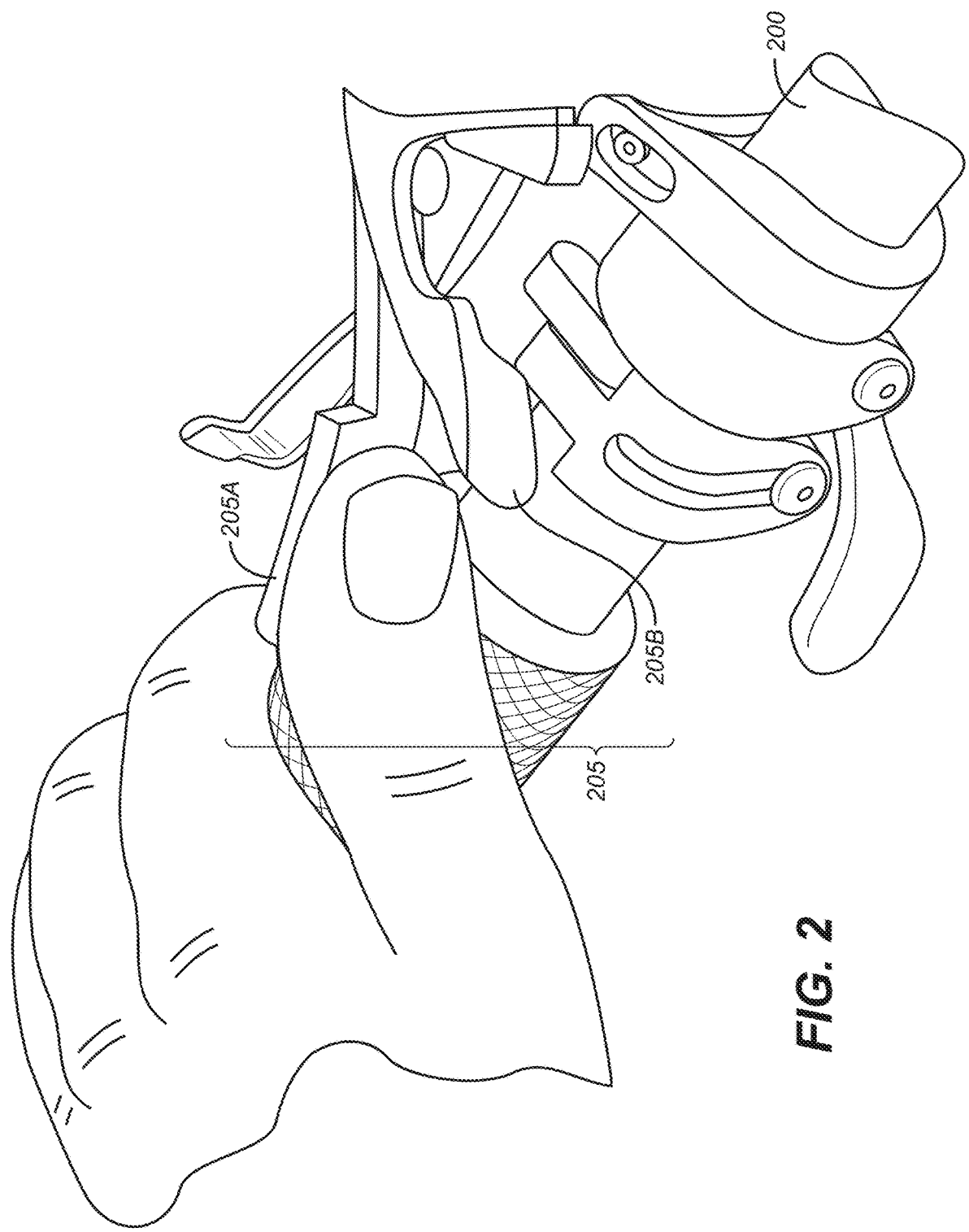
FIG. 2 is a perspective view of a handlebar with a control lever coupled therewith, in accordance with an embodiment.

Referring now to FIG. 2, a perspective view of handlebar 200 having the user interface 205 coupled therewith is shown in accordance with an embodiment. In one embodiment, the user interface 205 is mounted on handlebar 200. In one embodiment, user interface 205 is coupled with handlebar 200 via a clip or other retaining device. In one embodiment, user interface 205 communicates seatpost height instructions for the dropper seatpost assembly 300 to rotary flow control valve assembly 333 via a wired connection, via a wireless connection, or via a combination of wired and wireless connections.

In one embodiment, user interface 205 includes a wireless transmitter/receiver and is wirelessly coupled with rotary flow control valve assembly 333. Of note, the user interface 205 may be, but is not limited to, any of the following components capable of wirelessly communicating with the dropper seatpost assembly 300, e.g., a voice activation device, a GPS device having stored map, a smart phone, smart device, lever, button, or the like. Moreover, although the user interface 205 is shown coupled with handlebar 200. In another embodiment, the user interface 205 could be located on another portion of the bicycle frame 119, on a mount coupled with the vehicle, worn as a smart device, carried by the rider, or the like.

In one embodiment, user interface 205 includes at least one control, such as the first user interface 205A and may include a second user interface 205B, it should be understood that in an embodiment, there may be only a single control, or in an embodiment there may be a set of controls. In one embodiment, when the cyclist interacts the user interface 205, a signal is sent from the user interface 205 to the rotary flow control valve assembly 333. As described in detail herein, the signal causes a rotation of a rotary flow control valve within the rotary flow control valve assembly 333. The rotation of the rotary flow control valve causes the rotary flow control valve to open and/or close fluid flow between two or more fluid volumes within the dropper seatpost assembly 300. This rotational opening and/or closing of the rotary flow control valve allows the dropper seatpost assembly 300 to drop to a lower saddle ride height, or return to a previous saddle ride height as discussed in further detail herein.

Figure 3A:
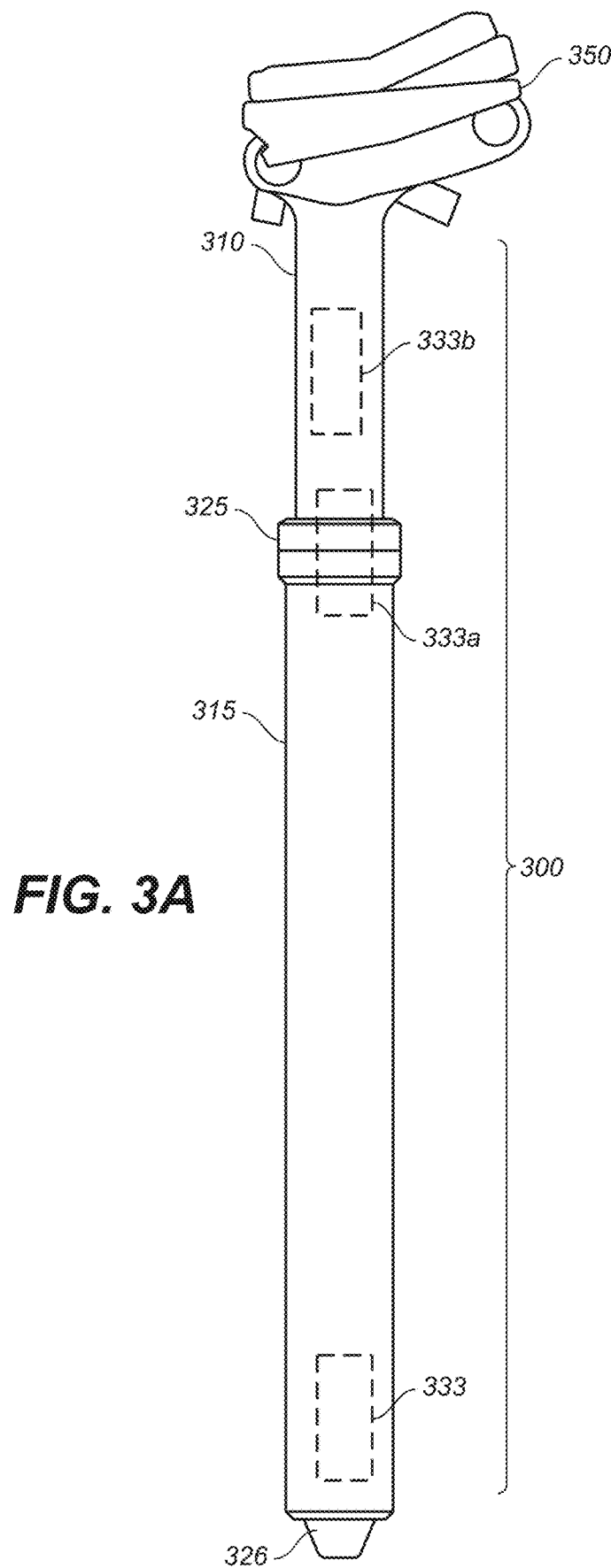
FIG. 3A is a perspective view of a rotary flow control valve in a dropper seatpost assembly, in accordance with an embodiment.

With reference now to FIG. 3A, a perspective view of a dropper seatpost assembly 300 coupled with a saddle clamp assembly 350 is shown in accordance with an embodiment. In one embodiment, the dropper seatpost assembly 300 includes an upper post 310, a lower post 315, a rotary flow control valve assembly 333 and a bottom 326. In one embodiment, some, part, or all of the rotary flow control valve assembly 333 is located in the lower post. In another embodiment, some, part, or all of the rotary flow control valve assembly 333 (shown as 333b for purposes of clarity) is located in the upper post. In one embodiment, some, part, or all of the rotary flow control valve assembly 333 (shown as 333a for purposes of clarity) could span the upper post and the lower post.

In one embodiment, e.g., a gravel or road bicycle, the dropper seatpost assembly 300 travel does not need to be as long and as such, the lower post 315 of the dropper seatpost assembly 300 can be trimmed or otherwise shortened. Therefore, in one embodiment, the location of the rotary flow control valve assembly 333 could be placed further toward the saddle 10 within the dropper seatpost assembly 300, such that an amount of material (e.g., a trimmable portion) could be removed from the outer post of the dropper seatpost assembly 300. In one embodiment, the trimmable option may also be important for purposes of weight reduction, a better fit between dropper seatpost assembly 300 and seat tube 93 (and/or bicycle frame 119), user preference, and the like.

Although FIG. 3A shows a number of rotary flow control valve assembly 333 locations, in general, there is only one rotary flow control valve assembly 333 and the shown locations of rotary flow control valve assembly 333 (e.g., 333, 333a, 333b, etc.) are indicative of a few of the possible placement locations for rotary flow control valve assembly 333.

In one embodiment, seat tube collar 325 is the highest portion of the lower post 315 and is indicative of the lowest possible setting for the dropper seatpost assembly 300 when it is installed into the bicycle frame 119 seat tube 93.

In one embodiment, the lower post 315 includes a top opening (e.g., approximately at seat tube collar 325) to receive the upper post 310 and a tubular sidewall axially extending between the top opening and the bottom 326 to form the lower post 315, the outer diameter (OD) of the tubular sidewall of the lower post 315 is smaller than an inner diameter (ID) of a seat tube 93 of bicycle frame 119, the lower post 315 for insertion into the seat tube 93. In one embodiment, bottom 326 is the lowest portion of lower post 315 relative to when lower post 315 is within seat tube 93.

In one embodiment, upper post 310 telescopically slides with respect to lower post 315. In one embodiment, the upper post 310 has an OD smaller than the ID of the lower post 315, such that a portion of the upper post 310 can telescopically slide within the lower post 315. In one embodiment, the upper post 310 has an ID larger than an OD of the lower post 315, such that a portion of the lower post 315 can telescopically slide within the upper post 310.

In one embodiment, upper post 310 and at least part of saddle clamp assembly 350 are formed as a single component. In another embodiment, upper post 310 and saddle clamp assembly 350 consist of two or more distinct and/or different components.

In one embodiment, when movement of the saddle is desired, (e.g., due to hills, terrain, aerodynamics, speed, etc.), a rider will cause the dropper seatpost assembly 300 to lower by triggering user interface 205 while the rider also depresses the saddle. In one embodiment, the user interface 205 will send a wireless signal to rotary flow control valve assembly 333 causing rotary flow control valve 420 to open a flow pathway such that the dropper seatpost assembly 300 will be capable of being moved down or up. In one embodiment, dropper seatpost assembly 300 has an air spring and use the rider's weight to move the saddle down, and will only raise the saddle back to the initial position when the rotary flow control valve assembly 333 is activated (e.g., wirelessly via user interface 205). In one embodiment, dropper seatpost assembly 300 is "micro-adjustable". There are two types of micro-adjustable seatposts: (1) seatposts that can be continuously adjusted to an infinite number of positions; and (2) seatposts that can only be adjusted to a predetermined (preprogrammed) number of positions.

For example, with regard to dropper seatposts that can only be adjusted to a preprogrammed number of positions, the dropper seatpost adjustment positions may be that of the following three positions: up; middle; and down. Generally, the rider prefers that the dropper seatpost assembly 300 be in the "up" position during a ride over flat terrain, a road surface, or pedaling up small hills on a road surface. The rider generally prefers that the dropper seatpost assembly 300 be in the "middle" position when the rider still wants a small amount of power through pedaling but yet would still like the saddle to be at least partially out of the way. This situation may occur while riding down a gentle hill or when the rider anticipates having to climb a hill immediately after a short decent. The rider generally prefers that the dropper seatpost assembly 300 be in the "down" position when the rider is standing up to provide the most amount of power through pedaling and wants the saddle to be at its lowest possible out of the way setting, when the rider is descending a hill, traversing bumpy terrain (e.g., bunny hoping, using flexed legs to absorb bumps, pump track type scenarios, etc.), or the like. For example, the lowest saddle position would be valuable during a decent where the rider would be positioned rearward of the saddle thereby moving the center of gravity lower and/or rearward resulting in a more stable and safer decent.

Additional details regarding the operation of a dropper seatpost assembly is found in U.S. Pat. No. 9,422,018 entitled "Seatpost" which is assigned to the assignee of the present application, and which is incorporated herein by reference in its entirety.

Figure 3B:
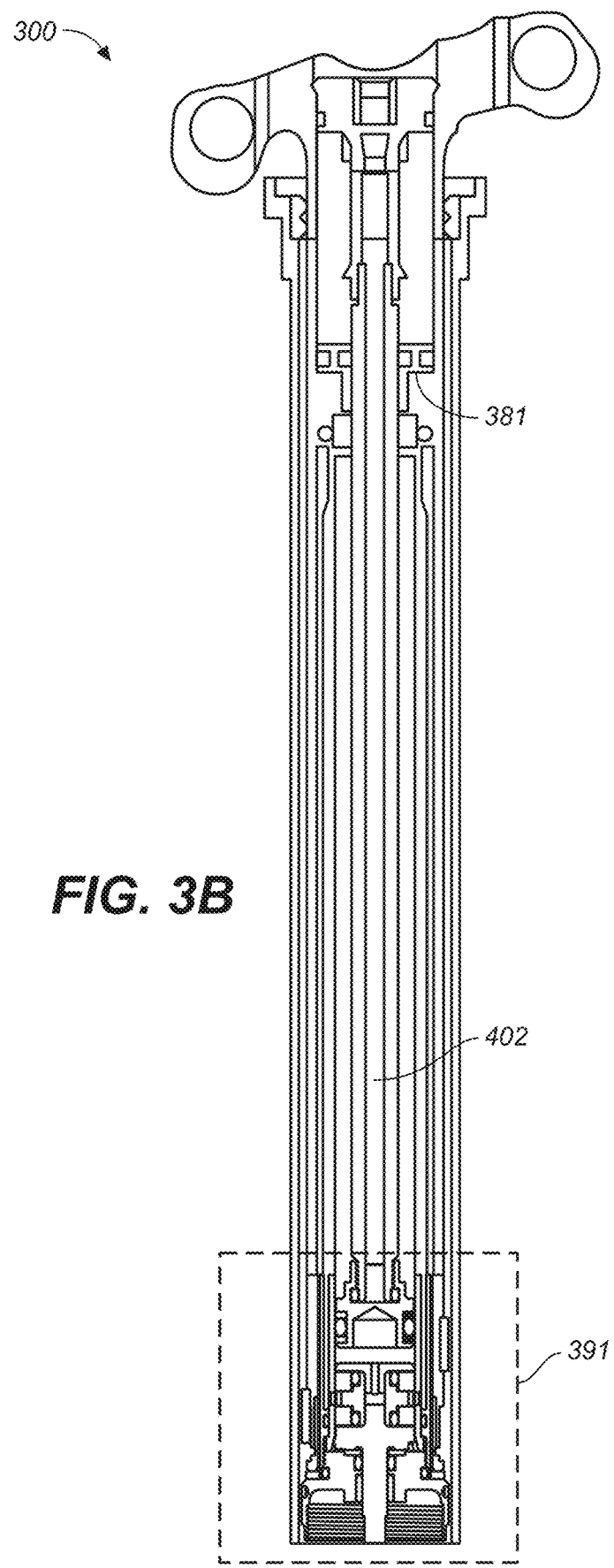
FIG. 3B is a cross-section view of the rotary flow control valve in a dropper seatpost assembly, in accordance with an embodiment.

Referring now to FIG. 3B, a cutaway view of the rotary flow control valve assembly 333 in the dropper seatpost assembly 300 of FIG. 3A is shown in accordance with an embodiment. For purposes of clarity, a discussion of the components that were visible and/or described in FIG. 3A will not be repeated herein, but are incorporated by the discussion of FIG. 3A in their entirety.

In FIG. 3B, dropper seatpost assembly 300 includes IFP (Internal Floating Piston) 381, translating shaft 402, and cutaway sectional view 391. In one embodiment, the IFP 381 charge allows a gas spring to be used to extend the dropper seatpost assembly 300. In cutaway sectional view 391, the rotary flow control valve assembly 333 is shown at the bottom 326 of dropper seatpost assembly 300. Is should be appreciated that the cross section is used to show one embodiment of the configuration of dropper seatpost assembly 300 including the location of IFP 381 and the rotary flow control valve assembly 333. However, as provided in further discussion herein, in another embodiment, one or more details of rotary flow control valve assembly 333 including different possible installation locations, variations, components, operational characteristics and the like are possible. The use of the embodiment of FIG. 3B is provided as an example of one embodiment and used herein for purposes of clarity.

Electronic Rotary Flow Control Valve Assembly

Figure 4A:
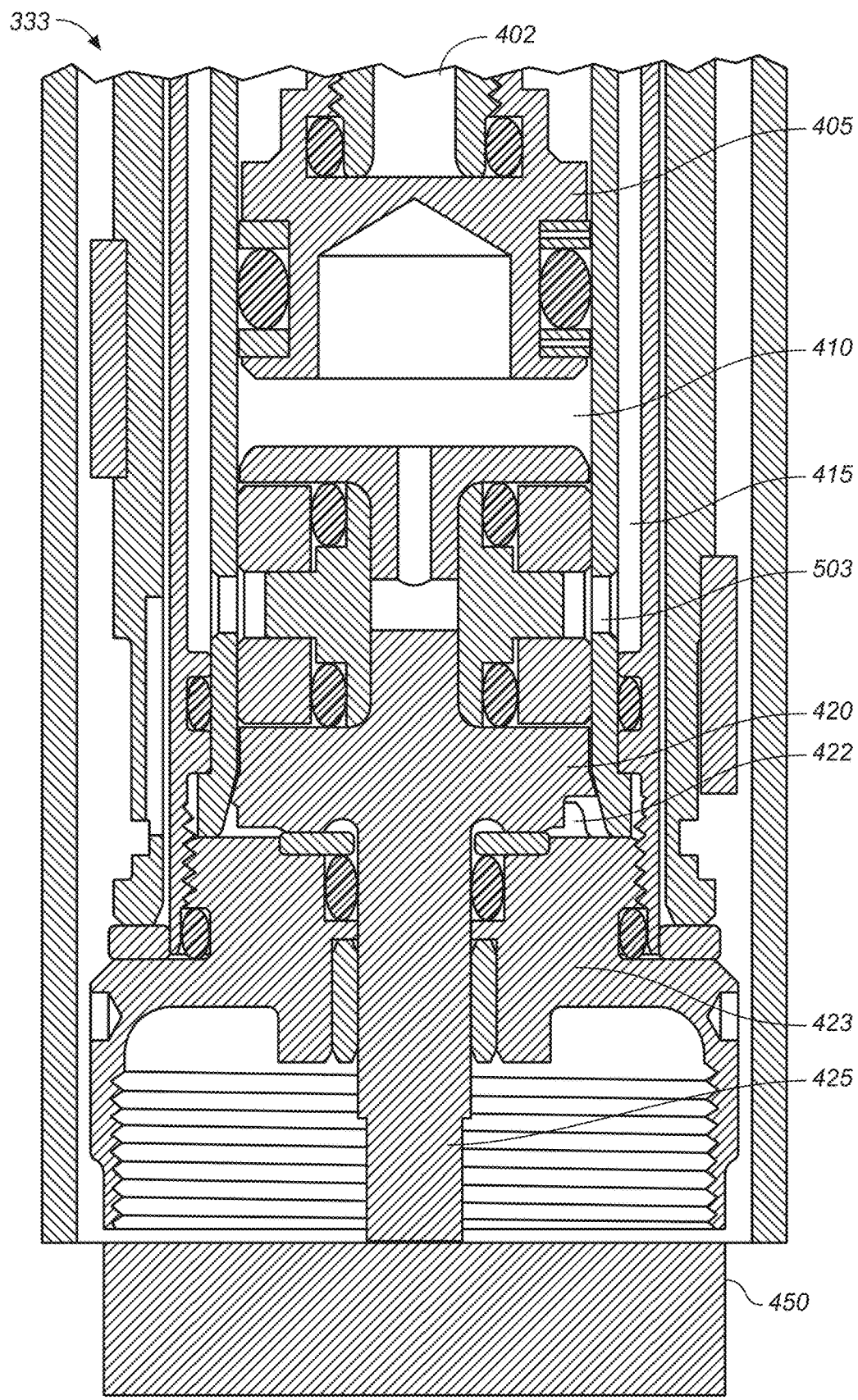
FIG. 4A is a cross-section view (identified in FIG. 3B) of a portion of the dropper seatpost assembly including a motor to electronically drive the rotary flow control valve assembly, in accordance with an embodiment.

With reference now to FIG. 4A, a cutaway sectional view 391 (as identified in FIG. 3B) of a portion of the dropper seatpost assembly 300 including the rotary flow control valve assembly 333 is shown in accordance with an embodiment. In one embodiment, rotary flow control valve assembly 333 includes a piston 405 connected to a translating shaft 402, a first chamber or inner chamber which is a fluid chamber pressurized by a rider's weight on the saddle 10. For purposes of clarity, the first chamber is referred to hereinafter as an inner fluid chamber 410 (or inner pressure tube). In one embodiment, rotary flow control valve assembly 333 also includes a second chamber having an annular region about inner fluid chamber 410 which is pressurized on extension and by the IFP 381. For purposes of clarity, the second chamber is referred to hereinafter as an outer fluid chamber 415 (or outer pressure tube). In one embodiment, the actions of the two chambers are reversed, e.g., the inner fluid chamber 410 is pressurized on extension and by the IFP 381 and the outer fluid chamber 415 is pressurized by the rider's weight on the saddle 10.

In one embodiment, rotary flow control valve assembly 333 is an electronic rotary flow control valve assembly which includes a rotary flow control valve 420 with a drive feature 425 which is coupled to motor 450. In one embodiment, the rotational input from motor 450 into drive feature 425 will change the rotary position of rotary flow control valve 420.

In one embodiment, motor 450 is a brushed DC motor with a gearbox. In one embodiment, motor 450 is a stepper motor, brushless motor, coreless motor, or the like.

In one embodiment, there is a cutout 422 in a portion of the rotary flow control valve 420 that interfaces with the lug 423 to create a hard stop. In one embodiment, the hard stop is used in the control system for the motor 450 as a current limit. For example, in one embodiment, when the motor 450 is activated, it will run until the motor 450 hits its current limit and is shut off. In so doing, the electronic rotary flow control valve assembly will quickly rotate the rotary flow control valve 420 the approximate 90 degree throw without requiring any additional controllers, inputs, etc.

In one embodiment, the cutout 422 in a portion of the rotary flow control valve 420 that interfaces with the lug 423 is used to key the rotary flow control valve 420 to the cross holes 503.

In one embodiment, rotary flow control valve assembly 333 is (effectively) a two-state valve. In other words, the rotary flow control valve assembly 333 is an on/off valve. In one embodiment, the rotary flow control valve 33 is an on/off valve such that it is fast enough in its response such that a user would not be able to stop the dropper seatpost assembly 300 between states (e.g., state 1—the original user set saddle height and state-2 the lowest dropper seatpost setting).

In one embodiment, the rotary flow control valve assembly 333 may have intermediate states (to limit flow, such as a high flow, a medium flow, a slow flow, etc., but not at zero flow). For example, the rotary flow control valve assembly 333 could have intermediate settings to control flow. In one embodiment, there may be a control system (an encoder on motor 450 with different settings thereon, a stepper motor, etc.) to control/adjust the on/off type rotating valve into one or more intermediate states, (e.g., between on and off), to provide a regulated flow.

In general, translating shaft 402 moves up and down with the saddle 10. In one embodiment, the translating shaft 402 is attached to the piston 405 to create the inner fluid chamber 410 which is at high pressure when the rider weight is being supported. In one embodiment, the outer fluid chamber 415 is a fluid chamber that is annular to the inner fluid chamber 410. When the rotary flow control valve 420 is opened, the fluid in the inner fluid chamber 410 moves through the open rotary flow control valve 420 and into the outer fluid chamber 415. In one embodiment, the movement of the fluid into the outer fluid chamber 415 will move the IFP 381 upward toward the top of the dropper seatpost assembly 300 as the dropper seatpost assembly 300 is compressed (or moved into its lower height).

Mechanically Actuated Rotary Flow Control Valve Assembly

Figure 4B:
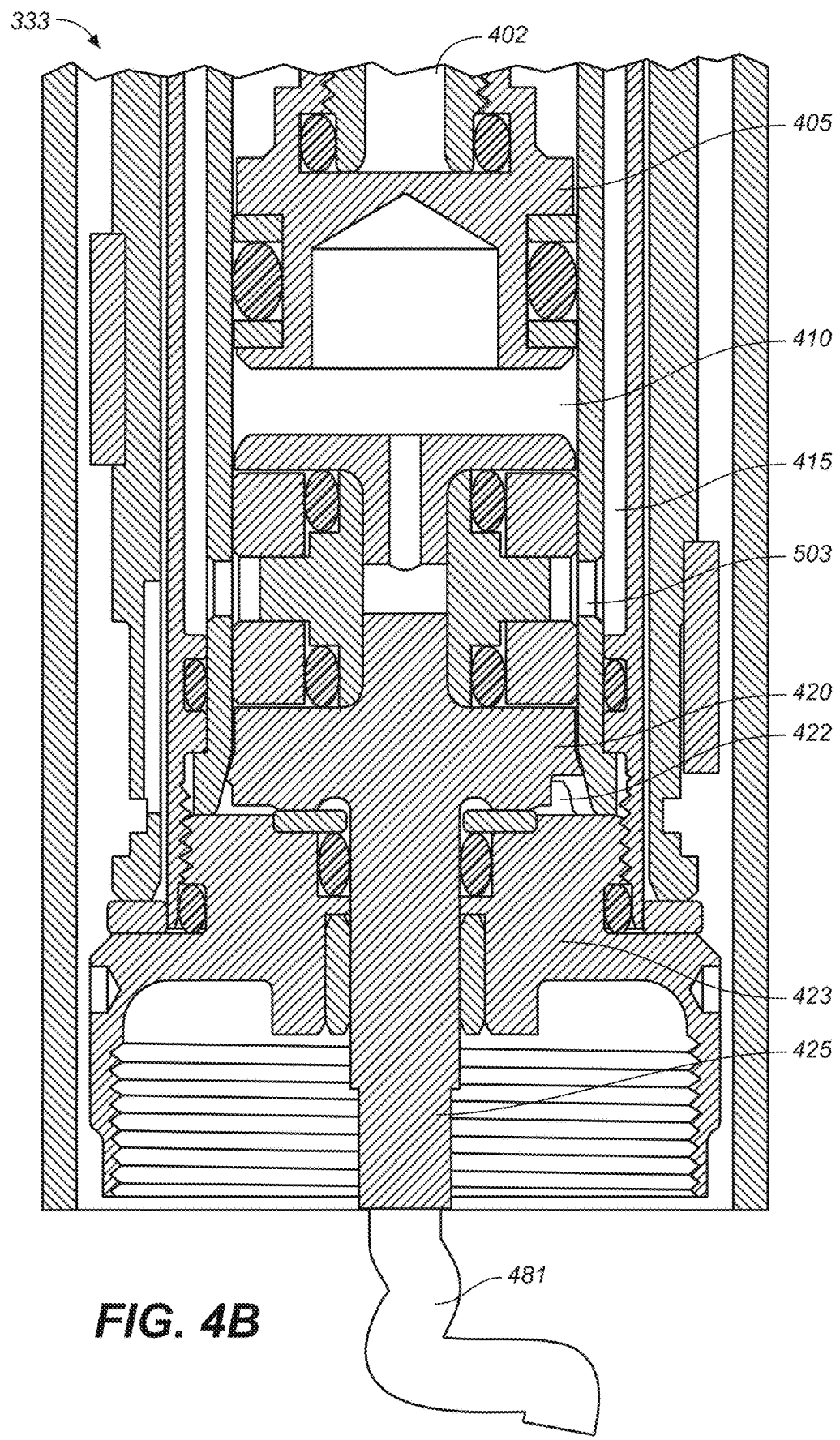
FIG. 4B is a cross-section view (identified in FIG. 3B) of a portion of the dropper seatpost assembly including a mechanical actuator for rotary flow control valve assembly, in accordance with an embodiment.

With reference now to FIG. 4B, a cross-section view (identified in FIG. 3B) of a portion of the dropper seatpost assembly 300 including a mechanical actuator 481 (e.g., a cable, hydraulic line, etc.) for mechanically actuating rotary flow control valve assembly 333 is shown in accordance with an embodiment. In general, the operation of the embodiment shown in FIG. 4B is similar to that of FIG. 4A, except for the change from a motor 450 used to electronically drive the rotary flow control valve assembly 333 of FIG. 4A, to a mechanical actuator to mechanically actuate the rotary flow control valve assembly 333.

In one embodiment, the mechanical actuator 481 would provide a control capability such that a user input on a user interface 205 (or similar type device) would provide a mechanical actuation of the rotary flow control valve within the rotary flow control valve assembly 333 to change the state from open, to closed, and/or to partially open.

With reference again to FIG. 3B and FIGS. 4A and 4B, in one embodiment, the components of rotary flow control valve assembly 333 are coupled together during manufacture/assembly to form a single rotary flow control valve assembly 333. In one embodiment, rotary flow control valve assembly 333 is broken down into two or more distinct and/or different component assemblies which are connectively coupled during installation to form an operational rotary flow control valve assembly 333.

For example, in one embodiment where the rotary flow control valve assembly 333 is broken down into two or more distinct and/or different component assemblies, one component assembly will include the piston 405, translating shaft 402, inner fluid chamber 410, outer fluid chamber 415, rotary flow control valve 420, and part of drive feature 425, and another component assembly will include part of a first assembly (e.g., may be located within the dropper seatpost assembly 300 and sealed from atmosphere while the drive feature 425 will extend through a seal of some type and out of the bottom 326 of dropper seatpost assembly 300) and the motor 450 is installed at a different location on the bicycle 50. Thus, upon installation of the dropper seatpost assembly 300 into the seat tube 93, the rotary flow control valve assembly 333 will be operationally assembled when the drive feature 425 of the rotary flow control valve 420 is in mechanical contact with motor 450.

In one embodiment, this mechanical contact occur when the motor 450 is installed within the seat tube 93 and the drive feature 425 makes mechanical contact therewith. In another embodiment, this mechanical contact occurs when the motor 450 is installed somewhere else on the vehicle and a mechanical connection is made between the drive feature 425 and the motor 450. In one embodiment, the mechanical connection may be a cable or the like that is coupled between the motor 450 and the drive feature 425, thereby allowing the output of motor 450 to be rotationally transferred to drive feature 425.

In one embodiment, rotary flow control valve assembly 333 also includes a battery power source and a transmitter/receiver (described herein) to provide the input signal and power to motor 450 causing motor 450 to operate the rotary flow control valve 420. In one embodiment, the battery power source is a disposable battery. In one embodiment, the battery is a rechargeable battery. In one embodiment, the battery can be recharged wired or wirelessly.

Single Assembly Discussion

In one embodiment, the components of rotary flow control valve assembly 333 are installed together during the build of dropper seatpost assembly 300, such that the piston 405, translating shaft 402, inner fluid chamber 410, outer fluid chamber 415, rotary flow control valve 420, drive feature 425 and motor 450 are within the sealed atmospheric environment of the dropper seatpost assembly 300. In the following discussion, this is referred to as a single rotary flow control valve assembly 333 housing embodiment.

In one embodiment, the single rotary flow control valve assembly 333 housing embodiment may include an O-ring or other type of seal about the drive feature 425 between the rotary flow control valve 420 and motor 450 to divide the single rotary flow control valve assembly 333 into a "wet" side and a "dry" side. In one embodiment, the "wet" side components (e.g., piston 405, translating shaft 402, inner fluid chamber 410, outer fluid chamber 415, rotary flow control valve 420) are within the area of, and exposed to the working fluid while the "dry" side components, (e.g., motor 450, transmitters, battery, non-contact charging components, and the like), are separated from the working fluid. Although the above discussion includes a list of one embodiment of "wet" side and "dry" side components. It should be appreciated that one or more of the components of the single rotary flow control valve assembly 333 could be moved from the "wet" side and/or "dry" side.

In one embodiment, when single rotary flow control valve assembly 333 housing embodiment is completely installed within the dropper seatpost assembly 300, the seal would be located somewhere along the drive feature 425 such that the working fluid can use the flow paths, e.g., inner fluid chamber 410, outer fluid chamber 415, rotary flow control valve 420, cross holes 503 (of FIGS. 5B and 5E), and the like, and flow can be controlled by the "wet" components, while the "dry" components will remain separate from the working fluid.

In one embodiment, the seal is also a pressure type fluid seal such that the "wet" components would be in a pressurized environment, while the "dry" components would remain at atmosphere. In one embodiment, by utilizing a pressure type fluid seal, the battery for the rotary flow control valve assembly 333 could be accessible for battery replacement. For example, in the dropper seatpost assembly 300 embodiment, some, or a portion of the bottom 326 could be removable to provide access to the battery and then be reinstalled to provide a level of protection from debris, water, etc. to the dropper seatpost assembly 300.

In one embodiment, by utilizing a pressure type fluid seal, a charging port for the battery of the single rotary flow control valve assembly 333 housing could be provided in the dropper seatpost assembly 300 wherever the single rotary flow control valve assembly 333 housing is located. For example, when the single rotary flow control valve assembly 333 housing is located close to, or in proximity of the bottom 326, bottom 326 could include a charging port. In one embodiment, the charging port would include a dust cover (or the like) to provide a level of protection from debris, water, etc. to the dropper seat post assembly when it is not in use.

In one embodiment, e.g., the single rotary flow control valve assembly 333 housing embodiment, the battery (or other power source such as a capacitor, etc.) has a wirelessly rechargeable capability such that the battery could be charged using a wireless power transfer system. E.g., using an inductive charger (or the like) within a given distance of the wirelessly rechargeable capability of the battery.

Wireless charging, in its most basic form utilizes a copper coil to create an oscillating magnetic field, which can create a current in one or more receiver antennas. In general, the wireless charger could be a charging pad that use tightly-coupled electromagnetic inductive or non-radiative charging; A charging bowl or through-surface type charger that uses loosely-coupled or radiative electromagnetic resonant charging to transmit a charge a few inches; An uncoupled radio frequency wireless charger that allows a trickle charging capability at distances of many feet, or the like.

Examples of a wireless power transfer systems that could be used in one or more embodiments include those defined by the wireless power consortium (WPC) Qi standard, the AirFuel Alliance (e.g., Duracell Powermat, PowerKiss, etc.), WiTricity, and the like.

In one embodiment, by using wireless power transfer, the battery can be charged even though it is sealed within the dropper seatpost assembly 300. In one embodiment, the battery can be charged while the dropper seatpost assembly 300 is installed in the seat tube 93. This can be dependent upon factors such as, the bicycle frame 119 (e.g., composite, metal, thin, thick, etc.), the type of wireless power transfer being used, etc.

In one embodiment, the dropper seatpost assembly 300 is removed from seat tube 93, and the portion of the dropper seatpost assembly 300 containing the rotary flow control valve assembly 333, including the battery, would be located proximate to the wireless charger to obtain the wireless charge.

Electronic Rotary Flow Control Valve

Figure 5A:
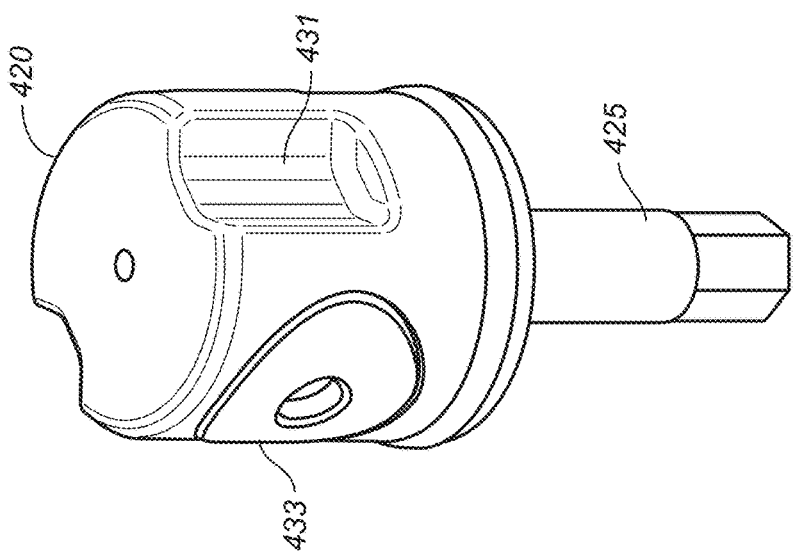
FIG. 5A is a perspective view of a rotary flow control valve, in accordance with an embodiment.

With reference now to FIG. 5A, a perspective view of a rotary flow control valve 420 is shown in accordance with an embodiment. In one embodiment, rotary flow control valve 420 includes at least one sealing portion 433 and one or more slots 431. In general, when the at least one sealing portion 433 is aligned with the one or more cross holes 503 (shown in FIGS. 5B and 5D), fluid flow between inner fluid chamber 410 and outer fluid chamber 415 is stopped. In contrast, when one or more slots 431 are aligned with the one or more cross holes 503 (shown in FIGS. 5B and 5C), fluid flow between inner fluid chamber 410 and outer fluid chamber 415 can occur.

In general, the direction of the fluid flow is based on the pressure differential between the working fluid within the inner fluid chamber 410 and outer fluid chamber 415. For example, if the dropper seatpost assembly 300 is in its extended state and the rider is sitting on the saddle 10, there will be more pressure on the fluid in inner fluid chamber 410. As such, when rotary flow control valve 420 is opened, the working fluid will flow from inner fluid chamber 410 to outer fluid chamber 415.

In contrast, if the dropper seatpost assembly 300 is in its compressed state, the IFP 381 will be charged and there will be more pressure on the fluid in outer fluid chamber 415. As such, when rotary flow control valve 420 is opened, as long as the rider is not sitting on the saddle 10, the fluid will flow from outer fluid chamber 415 into inner fluid chamber 410 due to the existing pressure differential.

In one embodiment, the rotary flow control valve 420 is a short throw valve where the difference between the open and the closed position is approximately 90 degrees or less. In one embodiment, the dropper seatpost assembly 300 will begin moving prior to the rotary flow control valve 420 completing its throw. For example, in one embodiment the exposed cross holes 503 have an angular sweep. As such, as soon as the rotary flow control valve 420 begins to expose the cross holes 503 between the inner fluid chamber 410 and the outer fluid chamber 415 fluid will start flowing and the dropper seatpost assembly 300 will start moving.

In one embodiment, the rotary flow control valve 420 is designed such that the angular rotation between the sealed state and the start of flow is minimized. In one embodiment, instead of the cross holes 503 being circular, other shapes and combinations of shapes may be used between the body and the rotary flow control valve 420. In one embodiment, instead of using single cross holes 503, a grid of holes are used instead of single cross holes. In one embodiment, a grid of holes, horizontal slot, other shapes or combinations of shapes are used instead of single cross holes to reduce the opportunity for seal extrusion.

In one embodiment, the rotary flow control valve 420 is a short throw valve where the difference between the open and the closed position is approximately 180 degrees or less.

In one embodiment, the rotary flow control valve 420 is a single rotation valve where the difference between the open and the closed position is approximately 360 degrees or less.

Figure 5D:
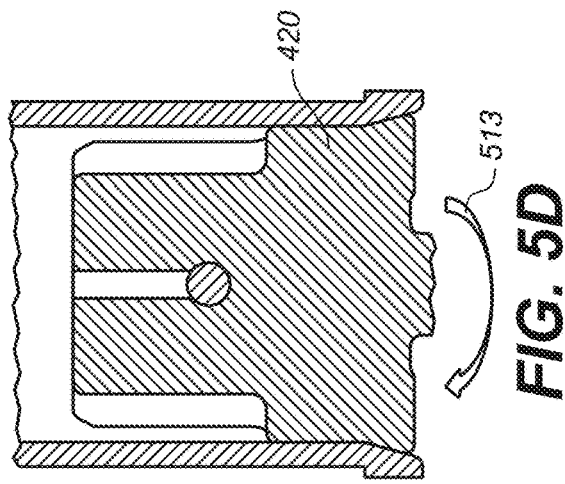
FIG. 5D is a partial cut-away view of the rotary flow control valve of FIG. 5A installed within the rotary flow control valve assembly in a closed position, in accordance with an embodiment.
Figure 5E:
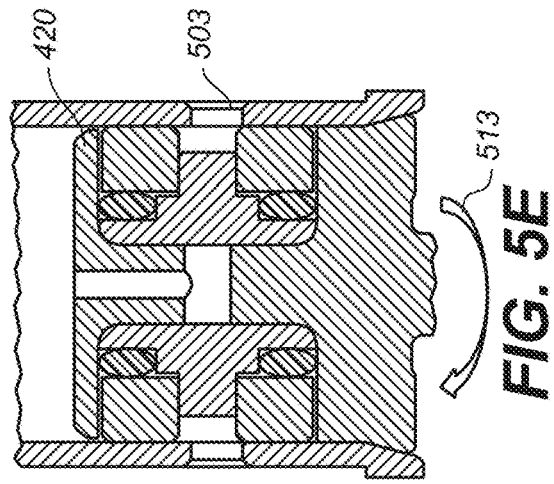
FIG. 5E is a cross-section view of the rotary flow control valve of FIG. 5A installed within the rotary flow control valve assembly in a closed position, in accordance with an embodiment.
Figure 5B:
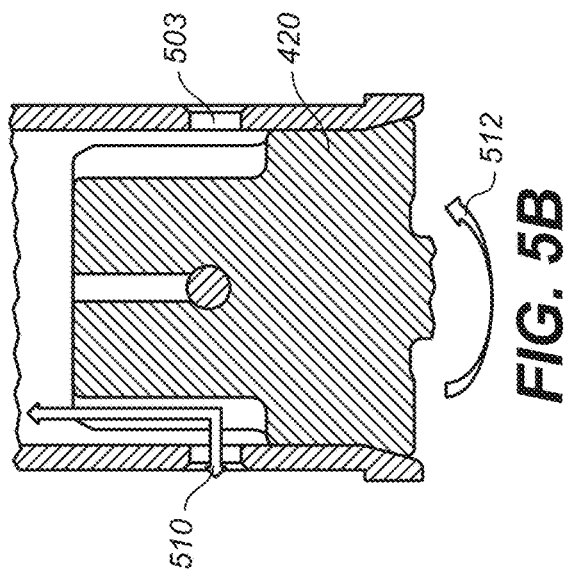
FIG. 5B is a partial cutaway view of the rotary flow control valve of FIG. 5A installed within the rotary flow control valve assembly in an open position, in accordance with an embodiment.
Figure 5C:
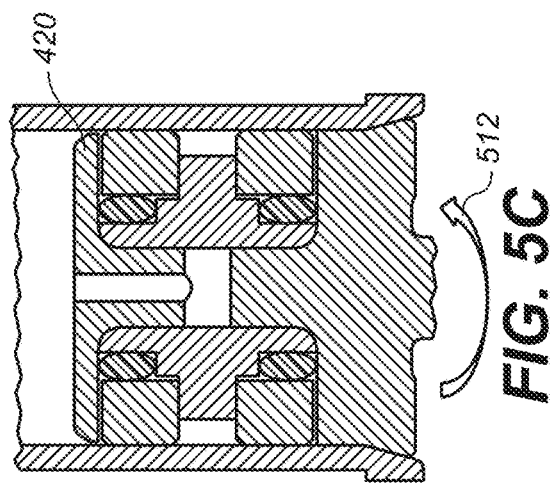
FIG. 5C is a cross-section view of the rotary flow control valve of FIG. 5A installed within the rotary flow control valve assembly in an open position, in accordance with an embodiment.

FIG. 5B is a partially cutaway view of the rotary flow control valve 420 of FIG. 5A installed within the rotary flow control valve assembly 333 with cross holes 503 and is shown in accordance with an embodiment. FIG. 5C, is a cross-section view of the rotary flow control valve 420 installed within the rotary flow control valve assembly 333 with cross holes 503 of FIG. 5B not shown in accordance with the position of rotary flow control valve 420 per an embodiment.

In FIGS. 5B and 5C, the rotary flow control valve 420 has been rotated (as shown by rotational arrow 512) into an open position such that fluid may flow 510 between the inner fluid chamber 410 and the outer fluid chamber 415 (not shown in this Figure for clarity) via the one or more slots 431 in the rotary flow control valve and through cross holes 503. For example, as discussed herein, when the saddle 10 is being compressed, the fluid will flow 510 from the inner fluid chamber 410 through the one or more slots 431 in rotary flow control valve 420 and cross holes 503 and into the outer fluid chamber 415. In contrast, when the saddle 10 is returning to its ride height (e.g., the dropper seatpost assembly 300 is extending), the fluid will flow 510 from the outer fluid chamber 415 through the cross holes 503 and the one or more slots 431 in rotary flow control valve 420 and into the inner fluid chamber 410.

FIG. 5D is a partially cut-away view of the rotary flow control valve 420 of FIG. 5A installed within the rotary flow control valve assembly 333 in a closed position (e.g., blocking cross holes 503) shown in accordance with an embodiment. FIG. 5E, is a cross-section view of the rotary flow control valve 420 installed within the rotary flow control valve assembly 333 in a closed position (e.g., the sealing portion 433 blocking fluid flow through cross holes 503) shown in accordance with an embodiment.

In FIGS. 5D and 5E, the rotary flow control valve 420 has been rotated (as shown by rotational arrow 513) into a closed position such that sealing portion 433 is aligned with cross holes 503 and fluid cannot flow between the inner fluid chamber 410 and the outer fluid chamber 415 (not shown in this Figure for clarity). Although rotational arrows 512 and 513 are shown as being operated in a first direction for opening and then in a second direction for closing the rotary flow control valve 420, one or more embodiments are well suited to other rotational directions, distances, etc.

In one embodiment, the rotary flow control valve assembly 333 includes the rotary flow control valve 420 and a rotary motor 450, such that all of the motion is rotary and as such, there is no need for any rotary to linear conversion. In other words, in one embodiment, there is no rotary to linear transmission and therefore no rotary to linear transmission is required. E.g., there is no need to convert the rotating motion from a motor to linear actuation motion.

Therefore, as the rotary flow control valve assembly 333 relies only on rotational motion, no axial extension is needed for the components to which it is installed (e.g., dropper seatpost assembly 300, or the like) other than the size of the rotary flow control valve assembly 333. In one embodiment, to provide an even smaller axial footprint, the output shaft from motor 450 is used as the drive feature 425 for rotary flow control valve 420.

In one embodiment, the rotary flow control valve 420 has bi-directional sealing. In other words, the rotary flow control valve 420 will fluidly seal the inner fluid chamber 410 from fluid communication with the outer fluid chamber 415 when the dropper seatpost assembly 300 is in the extended state to support compressive forces, e.g., the rider's interactions with the saddle 10 while riding. In so doing, the rider can ride the bike without the dropper seatpost assembly 300 lowering down before rotary flow control valve assembly 333 receives a commanded to do so. Moreover, in one embodiment because of the bi-directional sealing, the rotary flow control valve 420 will also fluidly seal the inner fluid chamber 410 from fluid communication with the outer fluid chamber 415 when the dropper seatpost assembly 300 is in the lowered state to support extension forces, e.g., the saddle 10 will remain in the lowered position even when upward forces are applied to the saddle 10. In so doing, the rider can use the saddle 10 (and or dropper seatpost assembly 300) to lift up some or all of the bike without the dropper seatpost assembly 300 moving upward. In other words, dropper seatpost assembly 300 will remain in the lowered state until rotary flow control valve assembly 333 receives a commanded to rotate the rotary flow control valve 420 into an open (or partially open) valve position thereby allowing the dropper seatpost assembly 300 to extend.

Figure 6B:
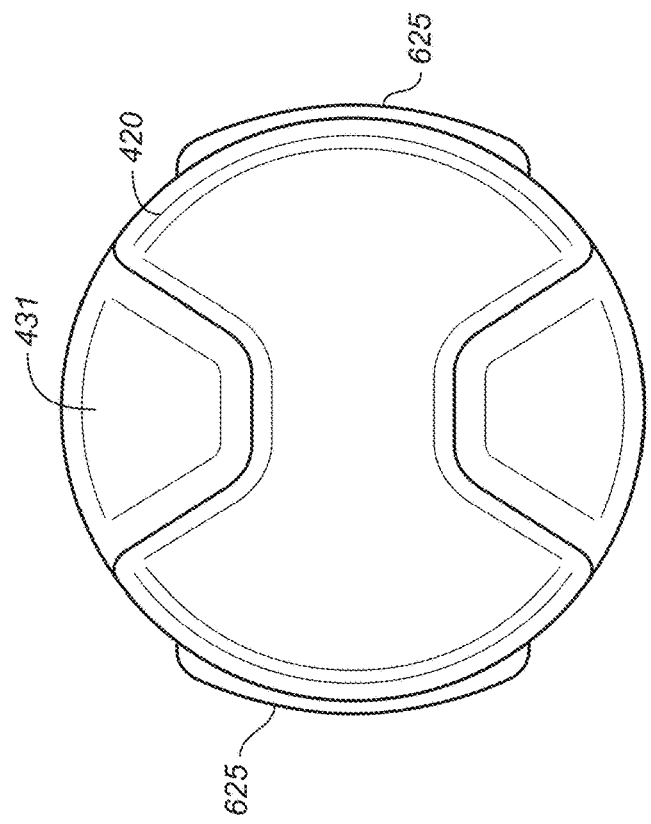
FIG. 6B is a top view of the head of rotary flow control valve with one or more O-ring type seals installed in glands thereon, in accordance with an embodiment.
Figure 6A:
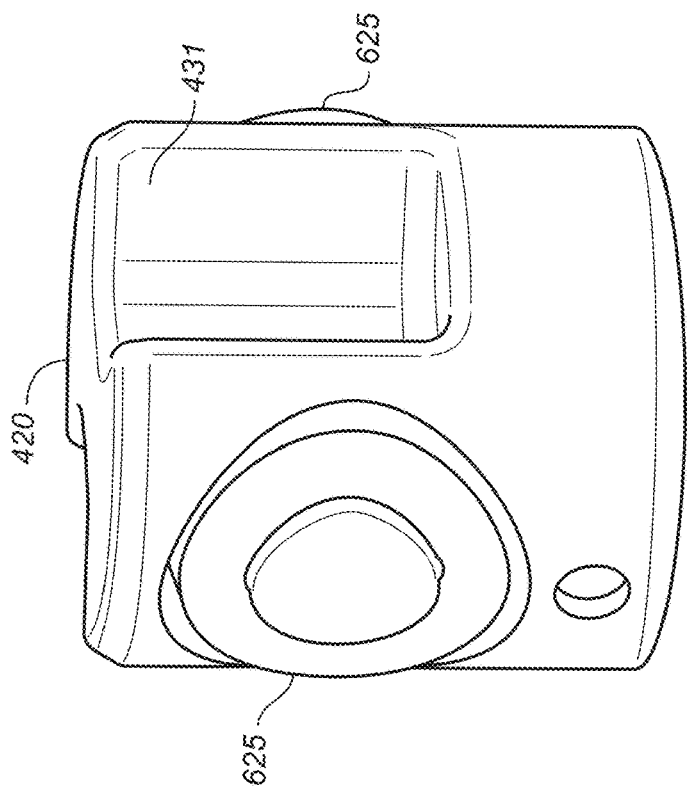
FIG. 6A is a perspective view of the head of rotary flow control valve with one or more O-ring type seals installed in a gland, in accordance with an embodiment.

FIG. 6A is a perspective view of the head of rotary flow control valve 420 with one or more O-ring type seals 625 installed in a gland in accordance with an embodiment. FIG. 6B is a top view of the head of rotary flow control valve 420 with one or more O-ring type seals 625 installed in glands thereon in accordance with an embodiment.

Figure 7C:
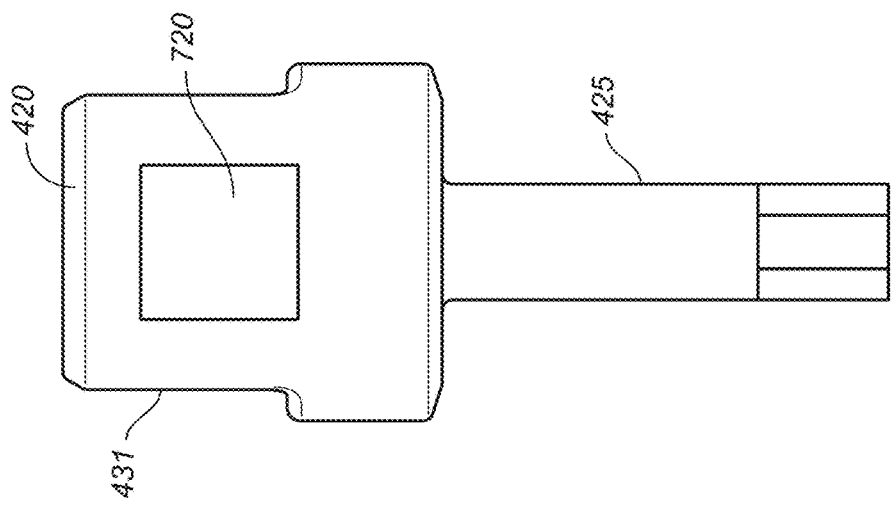
FIG. 7C is a side view of the rotary flow control valve of FIG. 7A with one or more preload pads installed thereon in accordance with an embodiment.
Figure 7B:
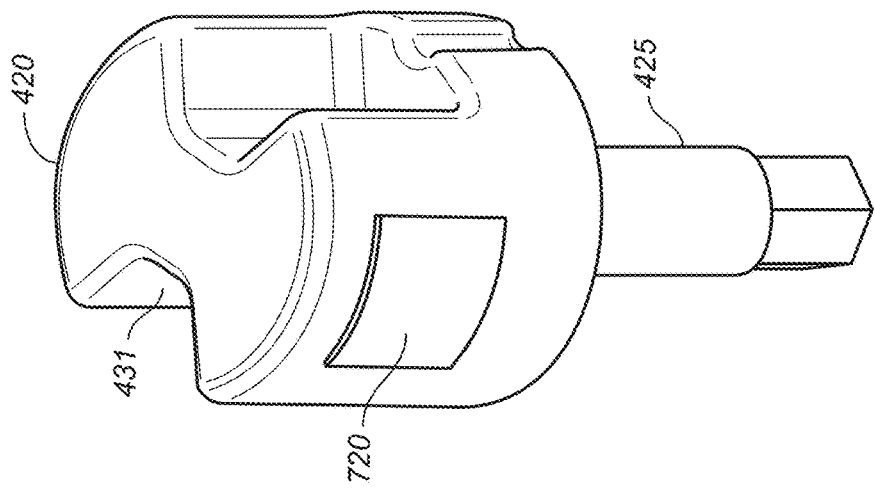
FIG. 7B is a perspective view of the rotary flow control valve of FIG. 7A with one or more preload pads installed thereon in accordance with an embodiment.
Figure 7A:
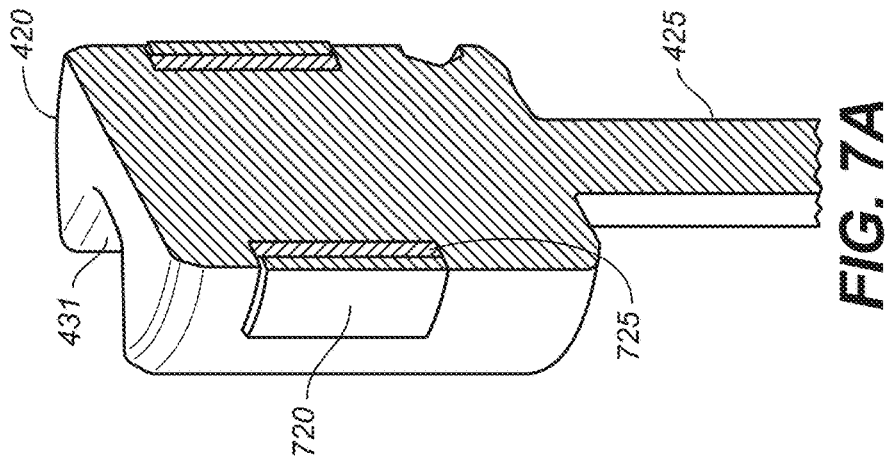
FIG. 7A is a perspective cross-section view of the rotary flow control valve with one or more preload pads installed thereon, in accordance with an embodiment.

FIG. 7A is a perspective cross-section view of the rotary flow control valve 420 with one or more preload pads 720 installed thereon in accordance with an embodiment. In one embodiment, each of the preload pads 720 consists of sealing material (e.g., a Teflon pad or the like) and a compliant material 725 is used to establish the preload on the sealing material of preload pads 720. FIG. 7B is a perspective view of the rotary flow control valve 420 with one or more preload pads 720 installed thereon in accordance with an embodiment. FIG. 7C is a side view of the rotary flow control valve 420 with one or more preload pads 720 installed thereon in accordance with an embodiment.

Figure 8B:
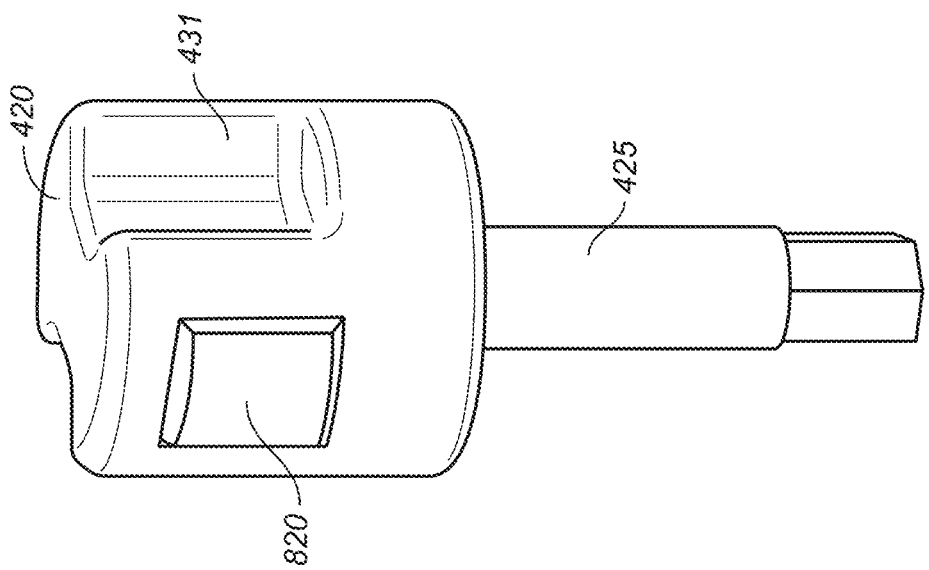
FIG. 8B is a perspective view of the rotary flow control valve of FIG. 8A with one or more preload pads installed thereon, in accordance with an embodiment.
Figure 8A:
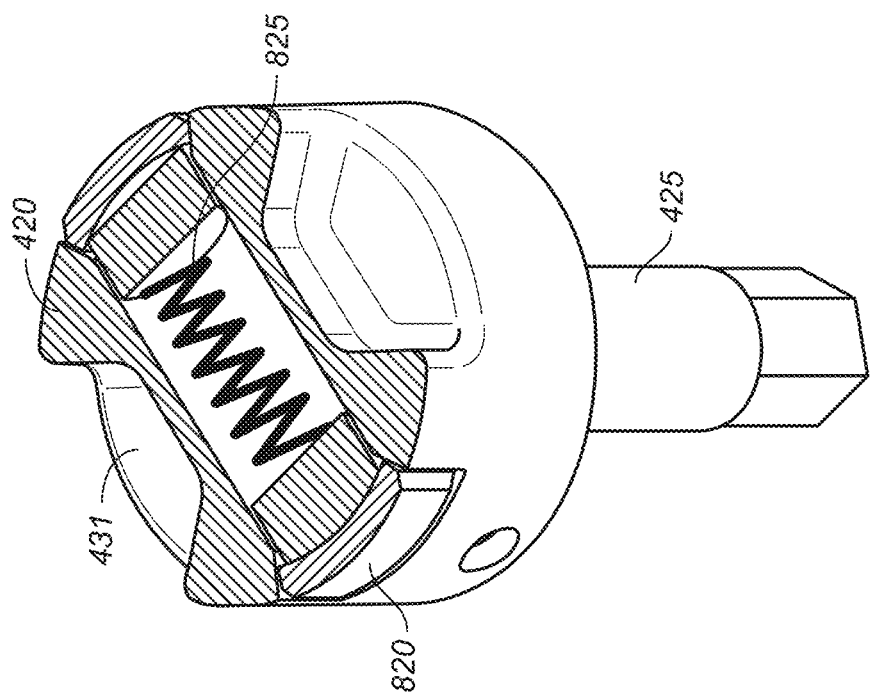
FIG. 8A is a top perspective cross-section view of a rotary flow control valve with one or more preload pads installed thereon, in accordance with an embodiment.

FIG. 8A is a top perspective cross-section view of the rotary flow control valve 420 with one or more preload pads 820 installed thereon in accordance with an embodiment. In one embodiment, each of the preload pads 820 consists of sealing material (e.g., a Teflon pad or the like) and a spring 825 is used to establish the preload on the preload pads 820. FIG. 8B is a perspective view of the rotary flow control valve 420 of FIG. 8A with one or more preload pads 820 installed thereon in accordance with an embodiment.

Rotary Flow Control Valve with Rotating Seal

Figure 9A:
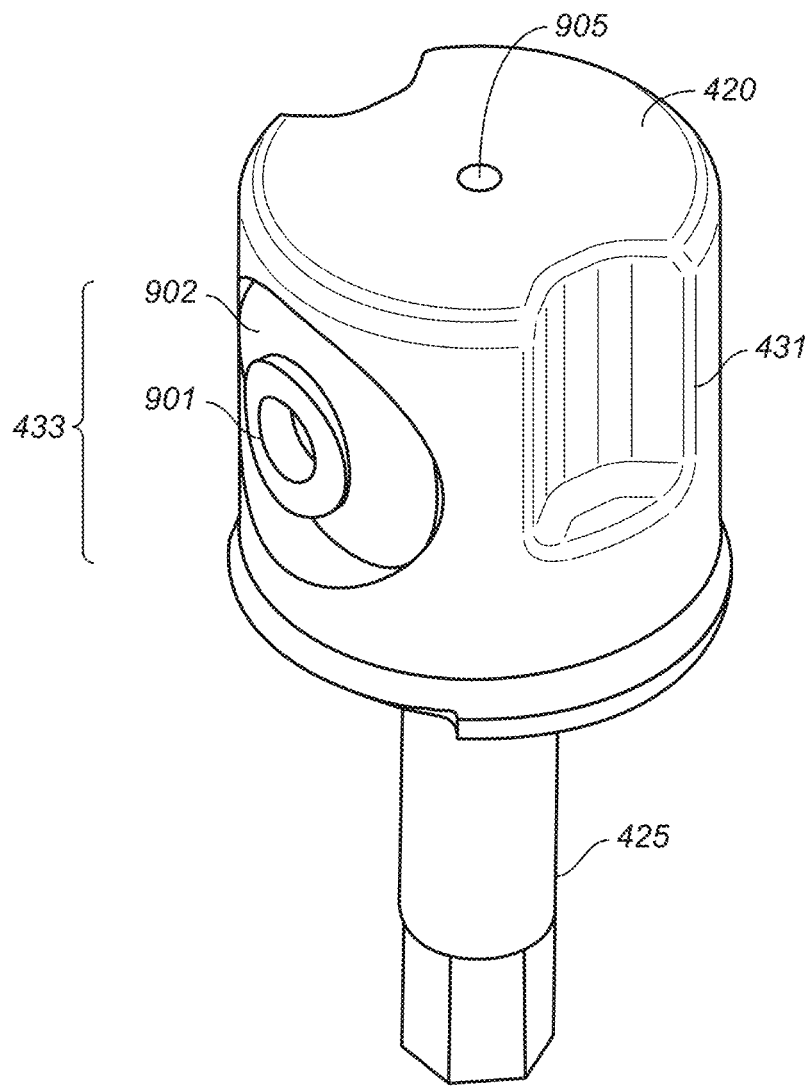
FIG. 9A is a perspective view of a rotary flow control valve with an optional flow hole therethrough, in accordance with an embodiment.

FIG. 9A is a perspective view of a rotary flow control valve 420 with an optional flow hole 905 therethrough, in accordance with an embodiment. In one embodiment, rotary flow control valve 420 of FIG. 9A is a self-charging seal design that includes an optional through hole (or flow hole 905) through a portion of rotary flow control valve 420, one or more slots 431, a drive feature 425, and at least one sealing portion 433. In one embodiment, the optional flow hole 905 acts like a "charging port" to provide additional fluid pressure to sealing portion 433 to retain a zero fluid flow rate between inner fluid chamber 410 and outer fluid chamber 415. In one embodiment, the flow hole 905 is optional depending upon the operating pressures on the fluids in one or both of inner fluid chamber 410 and/or outer fluid chamber 415.

Figure 9D:
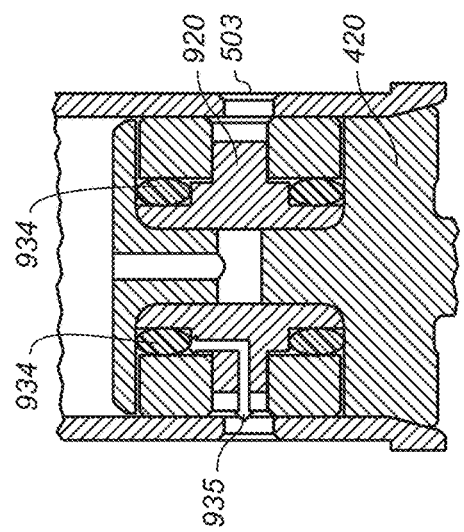
FIG. 9D is a cross-section view of the rotary flow control valve with a flow hole therethrough installed within the rotary flow control valve assembly, in accordance with an embodiment.
Figure 9C:
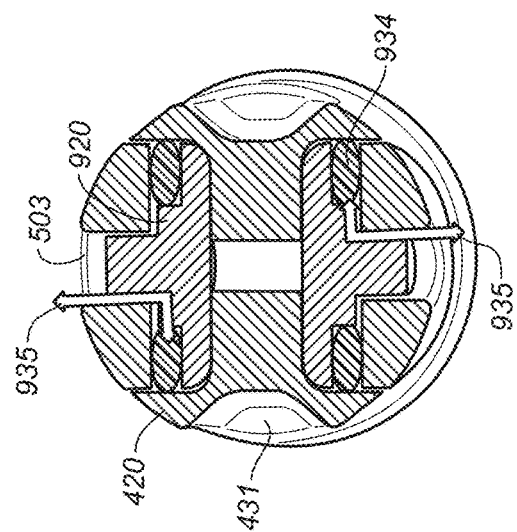
FIG. 9C is a top perspective cross-section view of a rotary flow control valve with a flow hole therethrough installed within the rotary flow control valve assembly, in accordance with an embodiment.

Referring now to FIG. 9A and to FIGS. 4A and 4B, in one embodiment, the at least one sealing portion 433 includes a first seal portion 901 and a second seal portion 902. In one embodiment, first seal portion 901 seals to an inner diameter of the cross holes 503 in the wall separating the inner fluid chamber 410 from the outer fluid chamber 415. In contrast, second seal portion 902 provides an additional seal surface area that is provided against the area of the wall surrounding the cross holes 503, and is used to increase the area of the at least one sealing portion 433 that is exposed to the fluid pressure differential (as shown in FIGS. 9B-9D).

In one embodiment, the size of second seal portion 902 is tailored to the specific application in which the rotary flow control valve 420 and/or the rotary flow control valve assembly 333 is being used. For example, if the sealing area of sealing portion 433 was equivalent only to the first seal portion 901 (e.g., the bore or flow hole 905 diameter), the high pressure would act over the entire area and the friction would be high. However, by using the increased size of sealing portion 433 to include the second seal portion 902, the area on both sides of the area that the high pressure is acting on are balanced, thereby limiting the normal force between the sealing portion 433 and the flow hole 905.

Similar to the discussion in the description of FIG. 5A, in FIG. 9A, when the at least one sealing portion 433 is aligned with the one or more cross holes 503 (shown in FIGS. 5B and 5D), fluid flow between inner fluid chamber 410 and outer fluid chamber 415 is stopped. In contrast, when one or more slots 431 are aligned with the one or more cross holes 503 (shown in FIGS. 5B and 5C), fluid flow between inner fluid chamber 410 and outer fluid chamber 415 can occur.

Figure 9B:
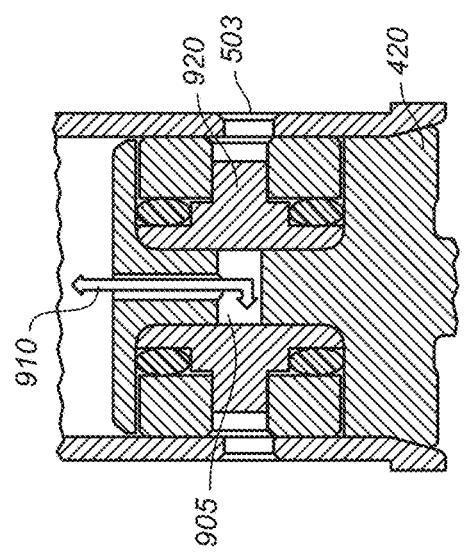
FIG. 9B is a cross-section view of the rotary flow control valve of FIG. 9A with a flow hole therethrough installed within the rotary flow control valve assembly, in accordance with an embodiment.

FIG. 9B is a cross-section view of the rotary flow control valve 420 with a flow hole 905 therethrough installed within the rotary flow control valve assembly 333, in accordance with an embodiment. In one embodiment, rotary flow control valve 420 of FIG. 9B is a self-charging seal design that includes a through hole (or flow hole 905) through a portion of rotary flow control valve 420 and one or more plungers 920.

Referring now to FIG. 9B and to FIGS. 4A and 4B, in a compression state of the dropper seatpost assembly 300, such as when the dropper seatpost assembly 300 is extended and the rider is sitting on the saddle 10, the high pressure from the inner fluid chamber 410 passes through the flow hole 905 of the rotary flow control valve 420 (as indicated by arrow 910) and increases a force to the one or more plungers 920 thereby increasing the sealing force keeping fluid from flowing out of inner fluid chamber 410 through the one or more cross holes 503 and into outer fluid chamber 415.

FIG. 9C is a top perspective cross-section view of a rotary flow control valve 420 with a flow hole 905 therethrough installed within the rotary flow control valve assembly 333, in accordance with an embodiment. FIG. 9D is a cross-section view of the rotary flow control valve 420 with a flow hole 905 therethrough installed within the rotary flow control valve assembly 333, in accordance with an embodiment. In one embodiment, rotary flow control valve 420 of FIGS. 9C and 9D is a self-charging seal design that includes a through hole (or flow hole 905) through a portion of rotary flow control valve 420 and one or more plungers 920.

Referring now to FIGS. 9C, 9D, and to FIGS. 4A and 4B, in an extension state of the dropper seatpost assembly 300, such as when the dropper seatpost assembly 300 is in its lowest height configuration (e.g., fully compressed), the high pressure is provided from the outer fluid chamber 415 and passes using a flow path indicated by arrows 935 along a portion of one or more plungers 920. This high pressure feeds into the one or more O-rings 934 which increases a force applied from the one or more plungers 920 to the one or more sealing portions 433. This increase in force, increases the sealing force of one or more plungers 920 which keeps fluid from flowing from outer fluid chamber 415 through the flow hole 905 and into inner fluid chamber 410.

FIG. 10A is a cross-section view of the rotary flow control valve 420 with a single O-ring installed within the rotary flow control valve assembly 333, in accordance with an embodiment. In one embodiment, rotary flow control valve assembly 333 includes the rotary flow control valve 420 with drive feature 425, inner fluid chamber 410, at least one O-ring 1020, a rod 1010, and one or more seals 1033.

In one embodiment, rod 1010 is used to support the at least one O-ring 1020 so that it does not collapse under any high pressures from the working fluid. The at least one O-ring 1020 charges the one or more seals 1033 and there is some area between the one or more seals 1033 and the rotary flow control valve 420 that is charged by the high pressure fluid in inner fluid chamber 410 causing the one or more seals 1033 to move outward toward cross holes 503.

FIG. 10B is a perspective view of the rotary flow control valve 420 with a single O-ring configuration of FIG. 10A. FIG. 10B shows the rotary flow control valve 420, the one or more seals 1033, and the rod 1010.

Figure 10D:
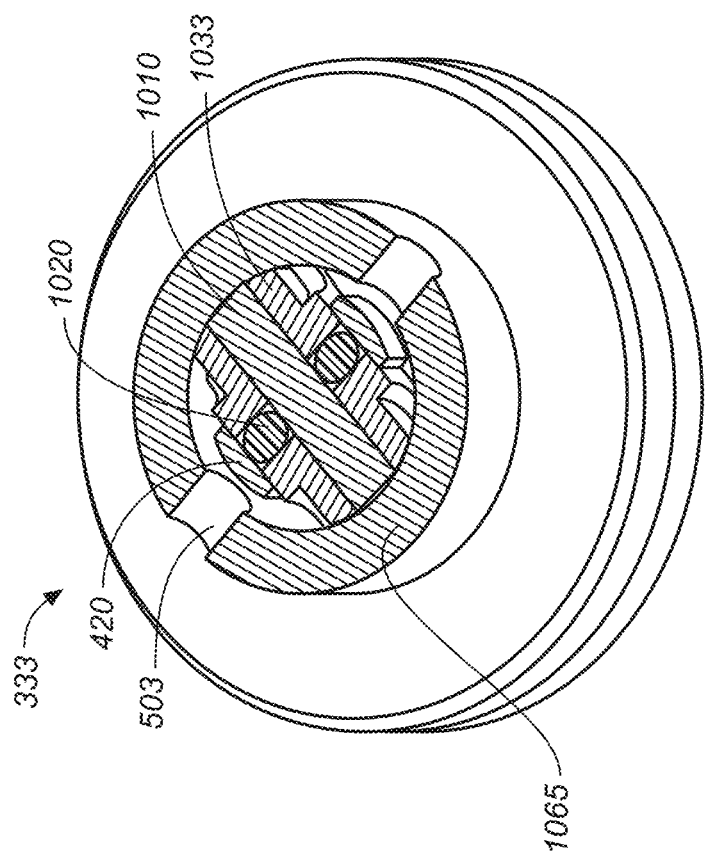
FIG. 10D is a top perspective cut away view of the rotary flow control valve with a single O-ring configuration installed within the rotary flow control valve assembly in an open state, in accordance with an embodiment.
Figure 10C:
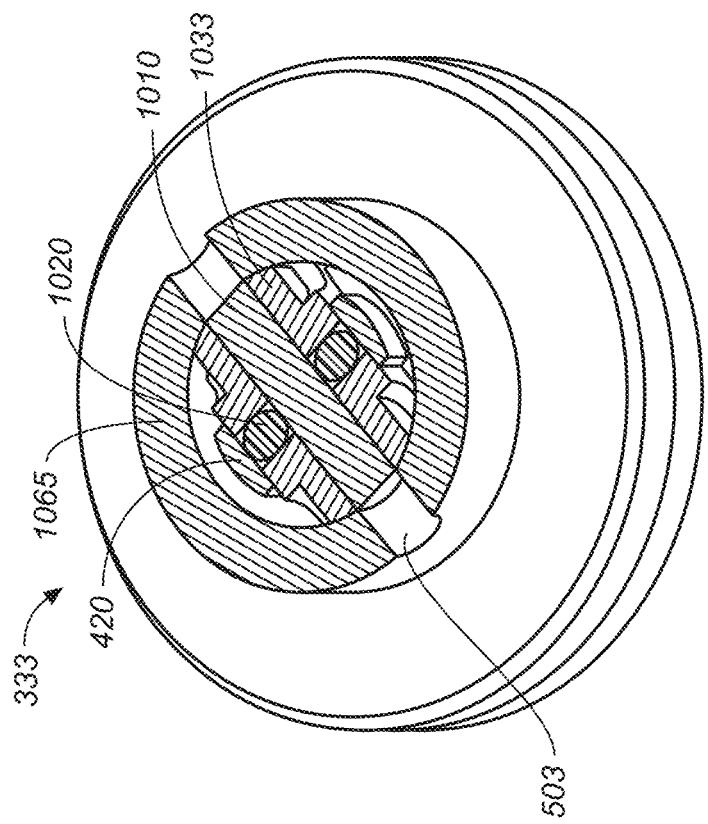
FIG. 10C is a top perspective cut away view of the rotary flow control valve with a single O-ring configuration installed within the rotary flow control valve assembly in a closed state, in accordance with an embodiment.

FIG. 10C is a top perspective cut away view of the rotary flow control valve 420 with a single O-ring configuration installed within the rotary flow control valve assembly 333 in a closed state, in accordance with an embodiment. In the closed state, rod 1010 is used to support the at least one O-ring 1020 so that it does not collapse under any high pressures from the working fluid. The at least one O-ring 1020 charges the one or more seals 1033 and there is some area between the one or more seals 1033 and the rotary flow control valve 420 that is charged by the high pressure fluid in inner fluid chamber 410 causing the one or more seals 1033 to move outward toward cross holes 503 thereby closing the fluid path through cross holes 503.

FIG. 10D is a top perspective cut away view of the rotary flow control valve 420 with a single O-ring configuration installed within the rotary flow control valve assembly 333 in an open state, in accordance with an embodiment. In the open state, rod 1010 continues to support the at least one O-ring 1020 so that it does not collapse under any high pressures from the working fluid. The at least one O-ring 1020 charges the one or more seals 1033 and there is some area between the one or more seals 1033 and the rotary flow control valve 420 that is charged by the high pressure fluid in inner fluid chamber 410 causing the one or more seals 1033 to move outward. However, since the rotary flow control valve 420 is now rotated such that the one or more seals 1033 are moving toward the wall 1065 between the inner fluid chamber 410 and the outer fluid chamber 415 and not toward cross holes 503 in wall 1065, the one or more slots 431 in rotary flow control valve 420 are providing an open fluid path between outer fluid chamber 415 and inner fluid chamber 410. In so doing, the fluid can flow from the higher pressure differential to the lower pressure differential between inner fluid chamber 410 and outer fluid chamber 415 through one or more slots 431 and cross holes 503.

Rotary Flow Control Valve with Rotating Shaft

Figure 11A:
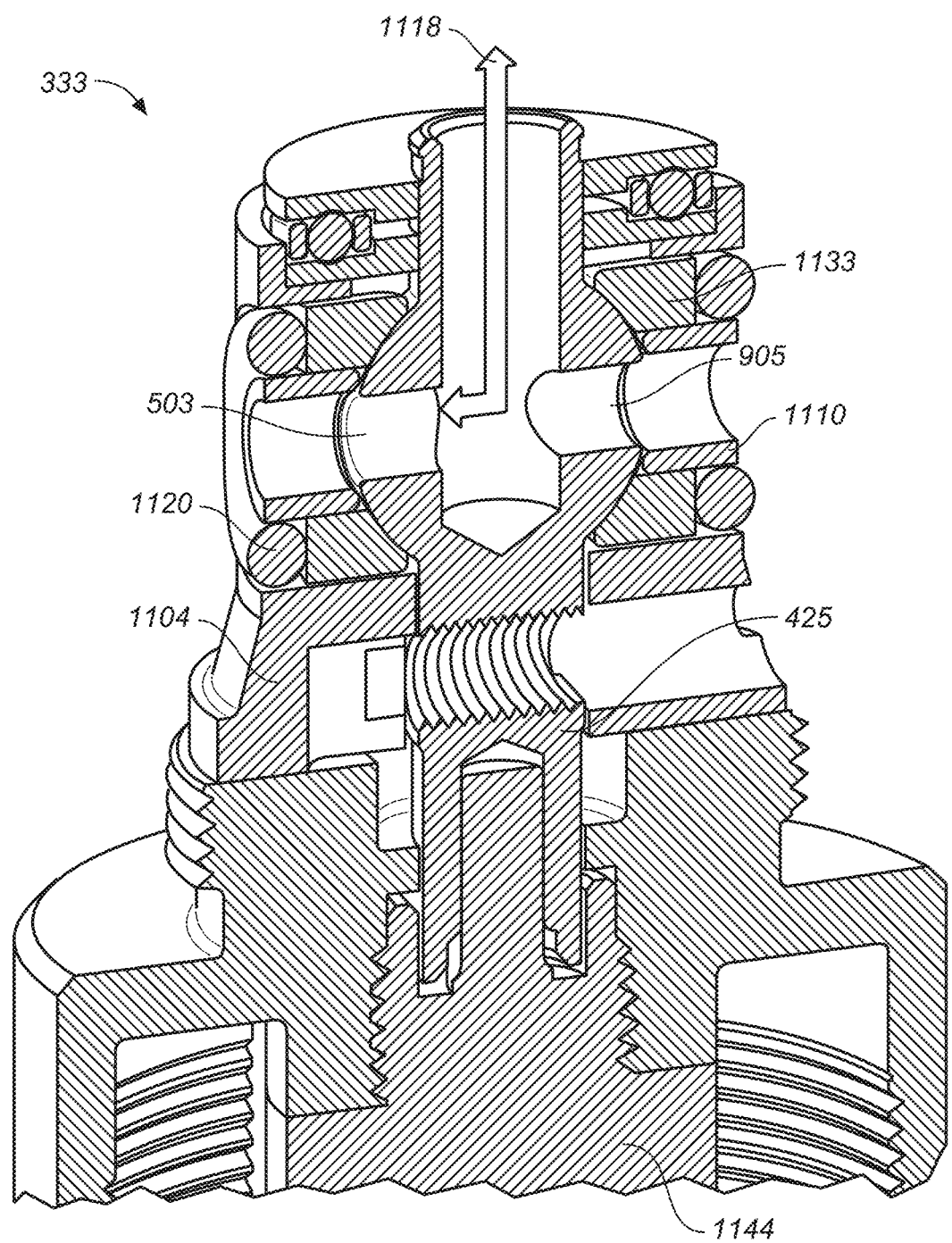
FIG. 11A is a cross-section view of a portion of a rotary flow control valve assembly with a rotating shaft configuration, in accordance with an embodiment.

FIG. 11A is a cross-section view of a portion of a rotary flow control valve assembly 333 with a rotating shaft configuration, in accordance with an embodiment. In one embodiment, the reason for using a rotating shaft style versus a rotating seal style is that in the rotating seal style the friction interface (e.g., between the sealing portion 433 and the wall 1065 between inner fluid chamber 410 and outer fluid chamber 415) is as far away from the centerline as possible (e.g., on the outside perimeter of rotary flow control valve 420). This distance from centerline is the longest possible moment arm and as such would maximize the torque required to rotate the rotary flow control valve 420.

In contrast, in the rotating shaft style of rotary flow control valve assembly 333 shown in FIG. 11A, the friction interface is moved closer to the center line thereby reducing the length of the moment arm and thus the torque required to rotate the rotating shaft as compared to the torque required to rotate the rotary flow control valve 420 in the rotating seal configuration. In one embodiment, the housing of the rotary flow control valve 420 does not rotate. Instead, the shaft within the rotary flow control valve 420 will rotate within the housing.

Referring still to FIG. 11A, in one embodiment, rotary flow control valve assembly 333 includes a rotary flow control valve 420 housing 1104, one or more cross holes 503, at least one O-ring 1120, a stub shaft 1110, at least one sealing portion 1133, a rotating drive shaft 425 (in the form of a ball valve, or other geometric shape), flow holes 905, a motor output shaft 1144, and a flow path 1118 shown in the flow holes 905 between the inner fluid chamber 410 and outer fluid chamber 415; where the inner fluid chamber 410 would be found above the opening at the top of the rotating drive shaft 425 and the outer fluid chamber 415 would be to the exterior of the one or more cross holes 503.

In one embodiment, the rotary flow control valve 420 housing 1104 does not rotate. Instead, the drive shaft 425 is the portion that rotates. In one embodiment, the at least one sealing portion 1133 (e.g., ball valve seats) is a dynamic seal in the sense that there is motion between the rotating drive shaft 425 and the at least one sealing portion 1133.

In one embodiment, the at least one O-ring 1120 seals to the one or more cross holes 503 and the inner fluid chamber 410 and charge the ball valve seat (e.g., the at least one sealing portion 1133) to create the pressure for the at least one sealing portion 1133. The stub shaft 1110 is used to keep the at least one O-ring 1120 from compressing on itself under pressure.

In one embodiment, the motor output shaft 1144 is coupled with the drive shaft 425. As stated herein, in one embodiment, the motor output shaft 1144 and the drive shaft 425 may be a single piece. In one embodiment, drive shaft 425 includes a ball valve type of shape and has a flow hole 905 therethrough.

Figure 11C:
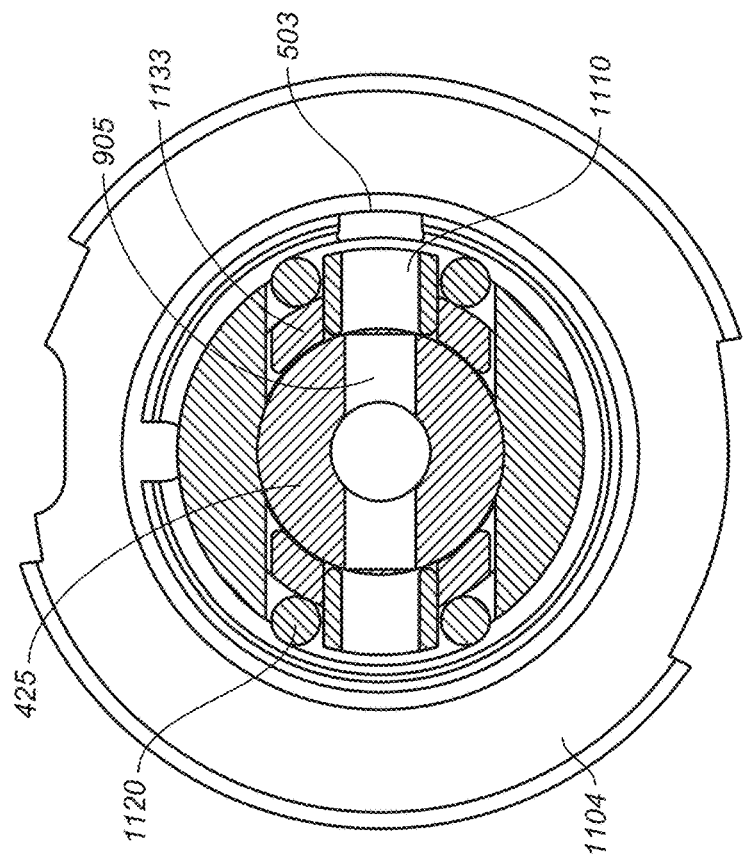
FIG. 11C is a top cross-section view of the rotary flow control valve assembly with a rotating drive shaft in an open state configuration, in accordance with an embodiment.
Figure 11B:
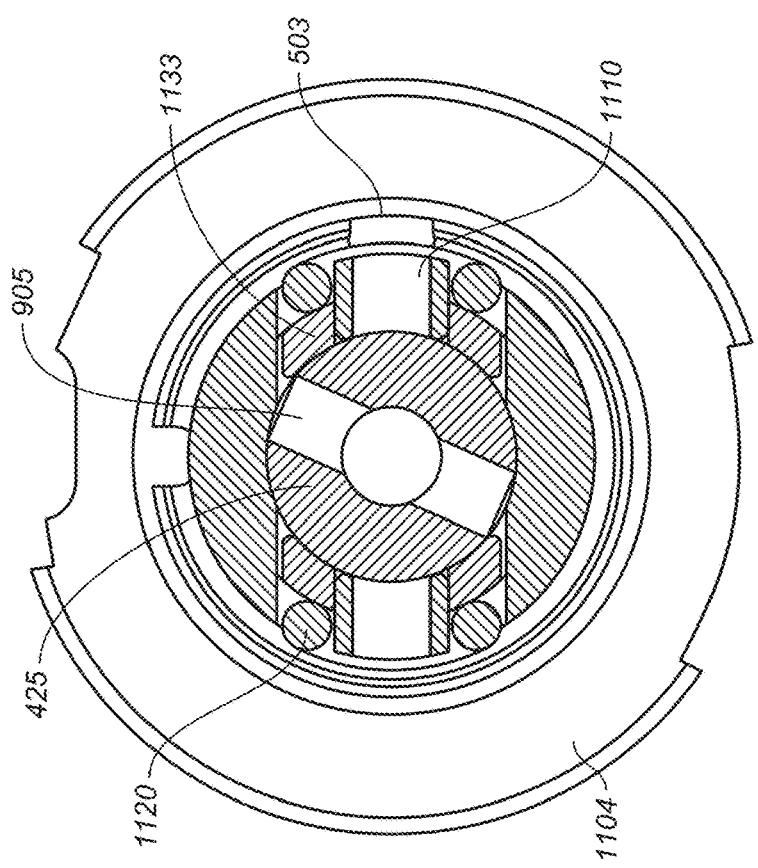
FIG. 11B is a top cross-section view of the rotary flow control valve assembly with a rotating drive shaft in a closed state configuration, in accordance with an embodiment.

Referring now to FIG. 11B, a top cross-section view of the rotary flow control valve assembly 333 with a rotating drive shaft in a closed state configuration is shown in accordance with an embodiment. In the closed state, housing 1104 does not rotate, stub shaft 1110 is used to support the at least one O-ring 1120 so that it does not collapse under any high pressures from the working fluid. The at least one O-ring 1120 charges the at least one sealing portion 1133, and the rotating drive shaft 425 with flow hole 905 is rotated to a closed position where the flow hole 905 is not aligned with cross holes 503 thereby stopping the fluid from using the fluid path of flow hole 905 from moving between inner fluid chamber 410 and outer fluid chamber 415 (as shown in FIGS. 4A and 4B).

FIG. 11C is a top cross-section view of the rotary flow control valve assembly 333 with a rotating drive shaft in an open state configuration, in accordance with an embodiment. In the open state, housing 1104 still does not rotate, stub shaft continues to support the at least one O-ring 1020 so that it does not collapse under any high pressures from the working fluid. The at least one O-ring 1020 charges the at least one sealing portion 1133 and the rotating drive shaft 425 with flow hole 905 is rotated to an open position. In the open position, the flow hole 905 within rotating drive shaft 425 provides an open fluid flow path between outer fluid chamber 415 and inner fluid chamber 410. In so doing, the fluid can flow from the higher pressure differential to the lower pressure differential between inner fluid chamber 410 and outer fluid chamber 415 through the flow hole 905 and cross holes 503.

Figure 11D:
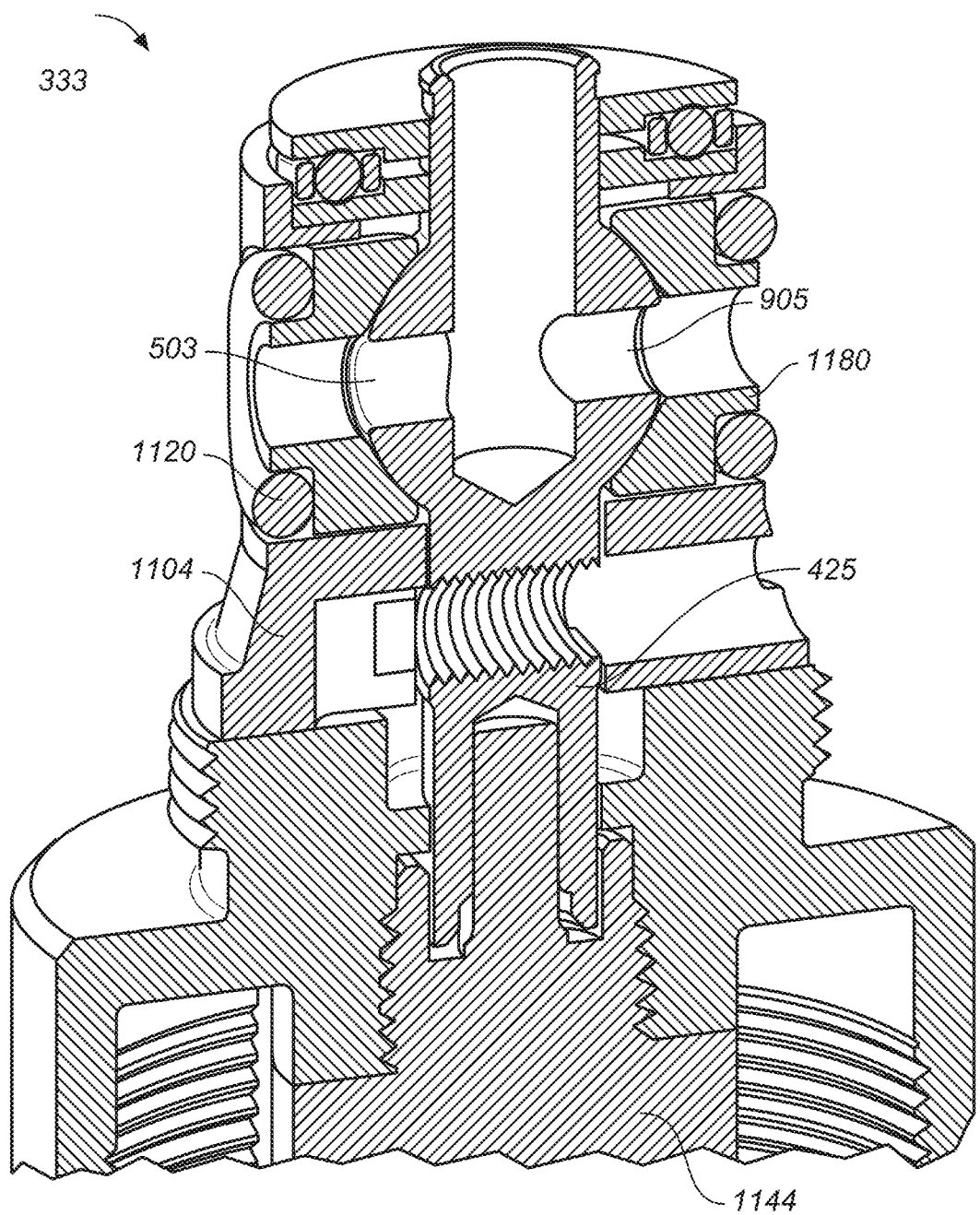
FIG. 11D is a cross-section view of a portion of a rotary flow control valve assembly with a rotating shaft configuration having a one piece ball valve seat, in accordance with an embodiment.

FIG. 11D is a cross-section view of a portion of a rotary flow control valve assembly 333 with a rotating shaft configuration having a one piece ball valve seat, in accordance with an embodiment. In general, the components and operation of FIG. 11D are similar to those of FIG. 11A. As such, the discussion of FIG. 11D will only include the differences between FIG. 11D and FIG. 11A.

In one embodiment, instead of being a plurality of different components/pieces, the at least one sealing portion 1133 is combined with stub shaft 1110 in a single piece ball valve seat 1180.

Figure 12A:
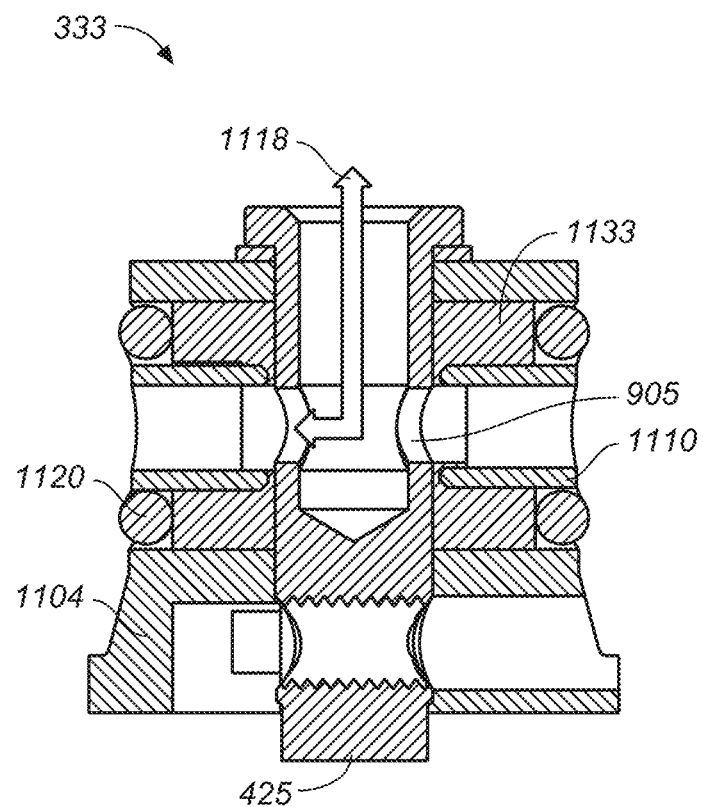
FIG. 12A is a cross-section view of a portion of a rotary flow control valve assembly with a rotating drive shaft in the form of a cylindrical shaft configuration, in accordance with an embodiment.

Referring now to FIG. 12A, a cross-section view of a portion of a rotary flow control valve assembly 333 having a rotating drive shaft in the form of a cylindrical shaft configuration is shown in accordance with an embodiment. In one embodiment, rotary flow control valve assembly 333 includes a rotary flow control valve 420 housing 1104, at least one O-ring 1120, a stub shaft 1110, at least one sealing portion 1133, a rotating drive shaft 425 (in the form of a cylindrical shaft, or other geometric shape), flow holes 905, and a flow path 1118 shown in the flow holes 905 between the inner fluid chamber 410 and outer fluid chamber 415; where the inner fluid chamber 410 would be found above the opening at the top of the rotating drive shaft 425 and the outer fluid chamber 415 would be to the exterior of the stub shaft 1110.

In one embodiment, the rotary flow control valve 420 housing 1104 does not rotate. Instead, the drive shaft 425 is the portion that rotates. In one embodiment, the at least one sealing portion 1133 (e.g., valve seats) is a dynamic seal in the sense that there is motion between the rotating drive shaft 425 and the at least one sealing portion 1133.

In one embodiment, the at least one O-ring 1120 seals to the one or more cross holes and the inner fluid chamber 410 and charge the valve seat (e.g., the at least one sealing portion 1133) to create the pressure for the at least one sealing portion 1133. The stub shaft 1110 is used to keep the at least one O-ring 1120 from compressing on itself under pressure.

In one embodiment, the motor output shaft is coupled with the drive shaft 425. As stated herein, in one embodiment, the motor output shaft and the drive shaft 425 may be a single piece. In one embodiment, drive shaft 425 includes a cylindrical shape and has a flow hole 905 therethrough.

Referring now to FIG. 12B, a top cross-section view of the rotary flow control valve assembly 333 with a rotating drive shaft 425 having a cylindrical shape is shown in a closed state configuration in accordance with an embodiment. In the closed state, housing 1104 does not rotate, stub shaft 1110 is used to support the at least one O-ring 1120 so that it does not collapse under any high pressures from the working fluid. The at least one O-ring 1120 charges the at least one sealing portion 1133, and the rotating drive shaft 425 with flow hole 905 is rotated to a closed position where the flow hole 905 is not aligned with cross holes 503 thereby stopping the fluid from using the fluid path of flow hole 905 from moving between inner fluid chamber 410 and outer fluid chamber 415 (as shown in FIGS. 4A and 4B).

FIG. 12C is a top cross-section view of the rotary flow control valve assembly 333 with a rotating drive shaft having a cylindrical shape is shown in an open state configuration in accordance with an embodiment. In the open state, housing 1104 still does not rotate, stub shaft continues to support the at least one O-ring 1020 so that it does not collapse under any high pressures from the working fluid. The at least one O-ring 1020 charges the at least one sealing portion 1133 and the rotating drive shaft 425 with flow hole 905 is rotated to an open position. In the open position, the flow hole 905 within rotating drive shaft 425 provides an open fluid flow path between outer fluid chamber 415 and inner fluid chamber 410. In so doing, the fluid can flow from the higher pressure differential to the lower pressure differential between inner fluid chamber 410 and outer fluid chamber 415 through the flow hole 905 and cross holes 503.

Figure 13A:
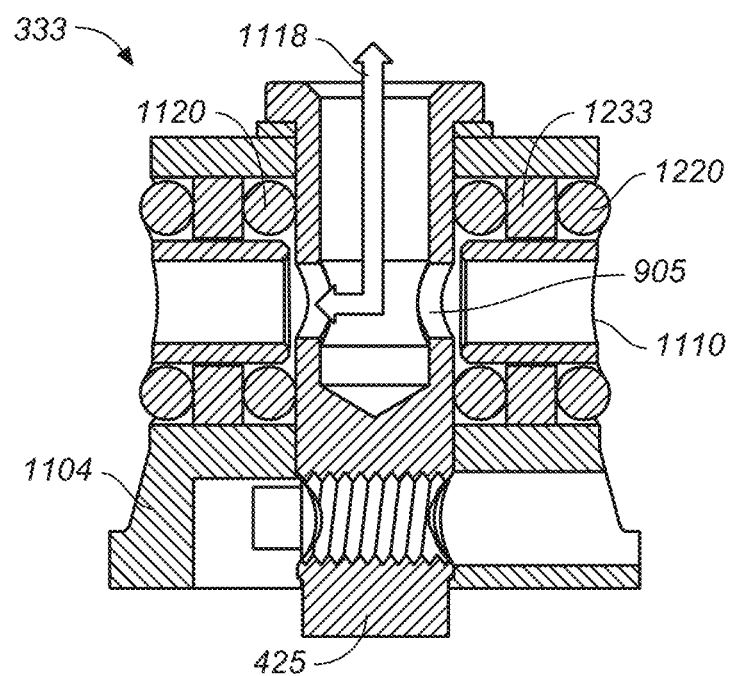
FIG. 13A is a cross-section view of a portion of a dual O-ring rotary flow control valve assembly with a rotating drive shaft in the form of a cylindrical shaft configuration, in accordance with an embodiment.

Referring now to FIG. 13A, a cross-section view of a portion of a dual O-ring rotary flow control valve assembly 333 having a rotating drive shaft 425 in the form of a cylindrical shaft configuration is shown in accordance with an embodiment. In one embodiment, rotary flow control valve assembly 333 is similar to the rotary flow control valve assembly 333 of FIG. 12A, and includes a rotary flow control valve 420 housing 1104, at least one dynamic O-ring 1120, at least one static O-ring 1220, and at least one component 1233, a stub shaft 1110, a rotating drive shaft 425 (in the form of a cylindrical shaft, or other geometric shape), flow holes 905, and a flow path 1118 shown in the flow holes 905 between the inner fluid chamber 410 and outer fluid chamber 415; where the inner fluid chamber 410 would be found above the opening at the top of the rotating drive shaft 425 and the outer fluid chamber 415 would be to the exterior of the stub shaft 1110.

In one embodiment, the rotary flow control valve 420 housing 1104 does not rotate. Instead, the drive shaft 425 is the portion that rotates. In one embodiment, the at least one static O-ring 1220 seals to the inner diameter (ID) of the inner fluid chamber 410 and loads through the at least one component 1233 which loads the at least one dynamic O-ring 1120 which creates the dynamic seal between the rotating drive shaft 425 and the seal.

In one embodiment, the stub shaft 1110 is used to keep the at least one O-ring 1120 and 1220 from compressing on themselves under pressure. In one embodiment, the motor output shaft is coupled with the drive shaft 425. As stated herein, in one embodiment, the motor output shaft and the drive shaft 425 may be a single piece. In one embodiment, drive shaft 425 includes a cylindrical shape and has a flow hole 905 therethrough.

Figure 13C:
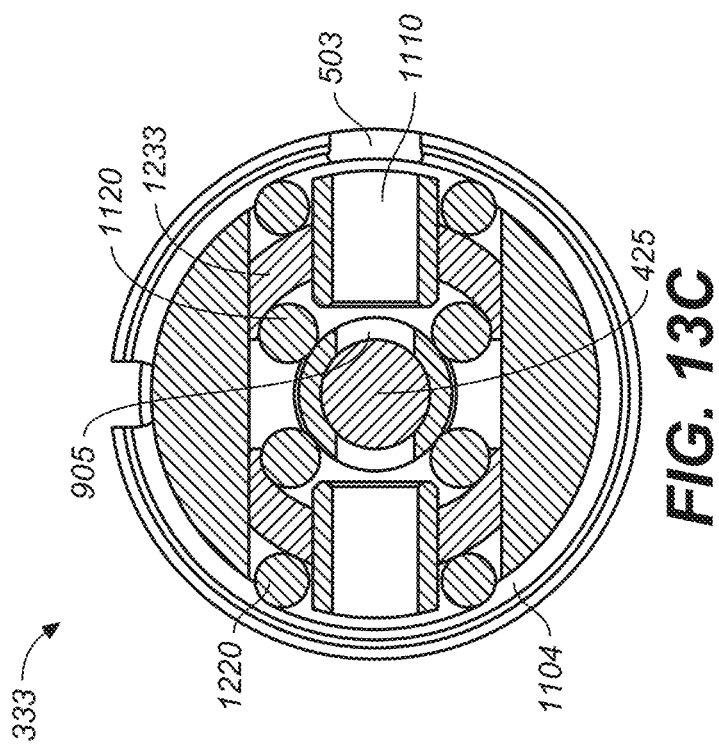
FIG. 13C is a top cross-section view of the dual O-ring rotary flow control valve assembly with a rotating drive shaft in the form of a cylindrical shaft configuration in an open state, in accordance with an embodiment.
Figure 13B:
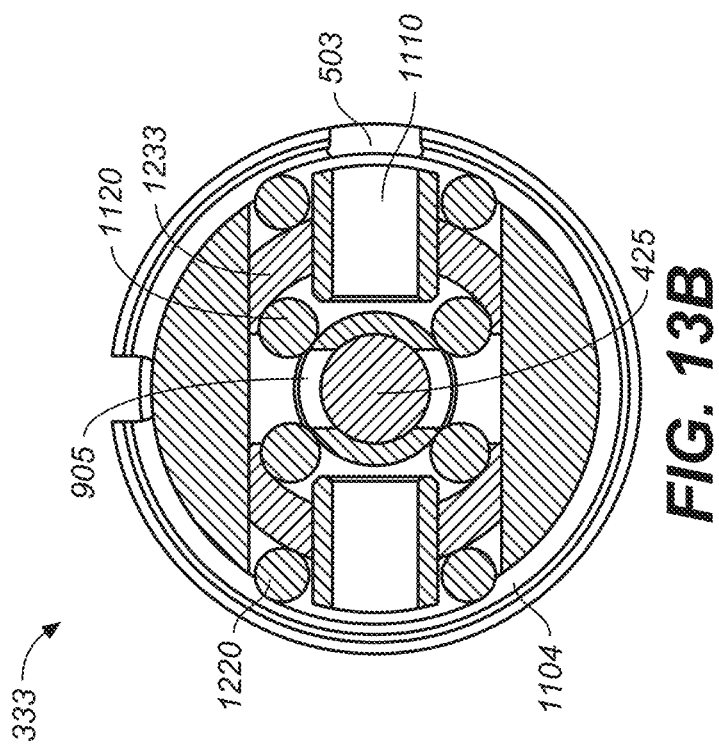
FIG. 13B is a top cross-section view of the dual O-ring rotary flow control valve assembly with a rotating drive shaft in the form of a cylindrical shaft configuration in a closed state, in accordance with an embodiment.

Referring now to FIG. 13B, a top cross-section view of the dual O-ring rotary flow control valve assembly 333 with a rotating drive shaft 425 having a cylindrical shape is shown in a closed state configuration in accordance with an embodiment. In the closed state, housing 1104 does not rotate, stub shaft 1110 is used to support the at least one O-ring 1120 and 1220 so that they do not collapse under any high pressures from the working fluid. The at least one static O-ring 1220 seals to the ID of the inner fluid chamber 410 and loads through the at least one component 1233 which loads the at least one dynamic O-ring 1120 which creates the dynamic seal between the rotating drive shaft 425 and the seal, and the rotating drive shaft 425 with flow hole 905 is rotated to a closed position where the flow hole 905 is not aligned with cross holes 503 thereby stopping the fluid from using the fluid path of flow hole 905 from moving between inner fluid chamber 410 and outer fluid chamber 415 (as shown in FIGS. 4A and 4B).

FIG. 13C is a top cross-section view of the dual O-ring rotary flow control valve assembly 333 with a rotating drive shaft having a cylindrical shape is shown in an open state configuration in accordance with an embodiment. In the open state, housing 1104 still does not rotate, stub shaft continues to support the at least one O-ring 1120 and 1220 so that they do not collapse under any high pressures from the working fluid. The at least one static O-ring 1220 seals to the ID of the inner fluid chamber 410 and loads through the at least one component 1233 which loads the at least one dynamic O-ring 1120 which creates the dynamic seal between the rotating drive shaft 425 and the seal, and the rotating drive shaft 425 with flow hole 905 is rotated to an open position. In the open position, the flow hole 905 within rotating drive shaft 425 provides an open fluid flow path between outer fluid chamber 415 and inner fluid chamber 410. In so doing, the fluid can flow from the higher pressure differential to the lower pressure differential between inner fluid chamber 410 and outer fluid chamber 415 through the flow hole 905 and cross holes 503.

Figure 14B:
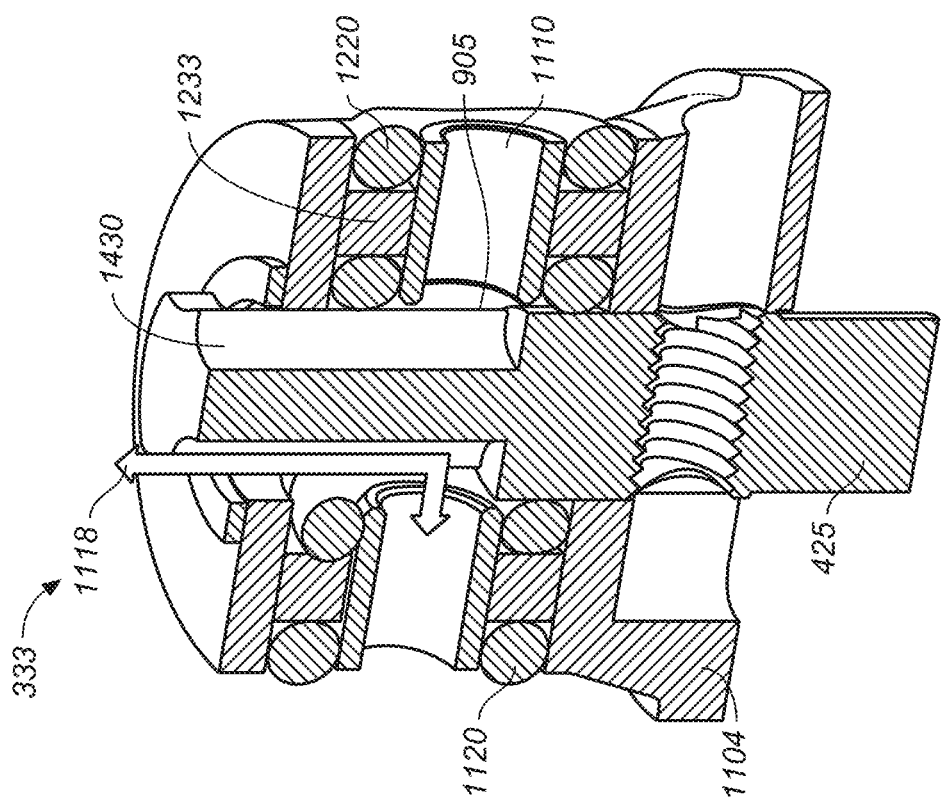
FIG. 14B is a cross-section view of a portion of a dual O-ring rotary flow control valve assembly having a rotating drive shaft in the form of a cylindrical shaft configuration with one or more slots therein, in accordance with an embodiment.
Figure 14A:
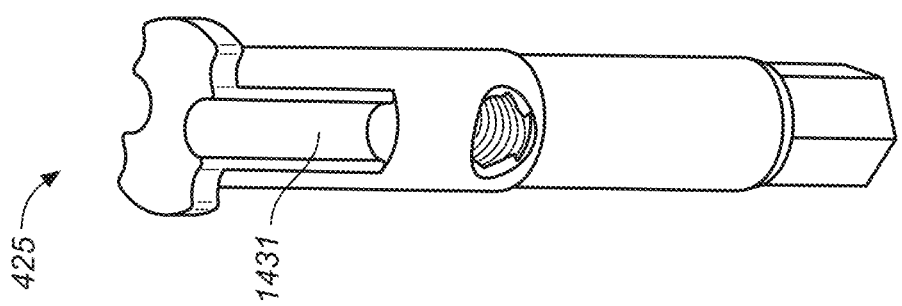
FIG. 14A is a perspective view of a rotating drive shaft in the form of a cylindrical shaft configuration with one or more slots therein, in accordance with an embodiment.

FIG. 14A is a perspective view of a rotating drive shaft 425 in the form of a cylindrical shaft configuration with one or more slots 1431 therein. In one embodiment, unlike the configurations where there is one or more flow holes 905 therein, in one embodiment, the rotating drive shaft 425 utilizes one or more slots 1431.

Referring now to FIG. 14B, a cross-section view of a portion of a dual O-ring rotary flow control valve assembly 333 having a rotating drive shaft 425 in the form of a cylindrical shaft configuration with one or more slots 1431 is shown in accordance with an embodiment. In one embodiment, rotary flow control valve assembly 333 is similar to the rotary flow control valve assembly 333 of FIG. 13A, and includes a rotary flow control valve 420 housing 1104, at least one dynamic O-ring 1120, at least one static O-ring 1220, and at least one component 1233, a stub shaft 1110, a rotating drive shaft 425 (in the form of a cylindrical shaft, or other geometric shape), one or more slots 1431, and a flow path 1118 shown along one or more slots 1431 between the inner fluid chamber 410 and outer fluid chamber 415; where the inner fluid chamber 410 would be found above the opening at the top of the rotating drive shaft 425 and the outer fluid chamber 415 would be to the exterior of the stub shaft 1110.

In one embodiment, the rotary flow control valve 420 housing 1104 does not rotate. Instead, the drive shaft 425 is the portion that rotates. In one embodiment, the at least one static O-ring 1220 seals to the inner diameter (ID) of the inner fluid chamber 410 and loads through the at least one component 1233 which loads the at least one dynamic O-ring 1120 which creates the dynamic seal between the rotating drive shaft 425 and the seal.

In one embodiment, the stub shaft 1110 is used to keep the at least one O-ring 1120 and 1220 from compressing on themselves under pressure. In one embodiment, the motor output shaft is coupled with the drive shaft 425. As stated herein, in one embodiment, the motor output shaft and the drive shaft 425 may be a single piece. In one embodiment, drive shaft 425 includes a cylindrical shape and has one or more slots 1431 therethrough.

Figure 14C:
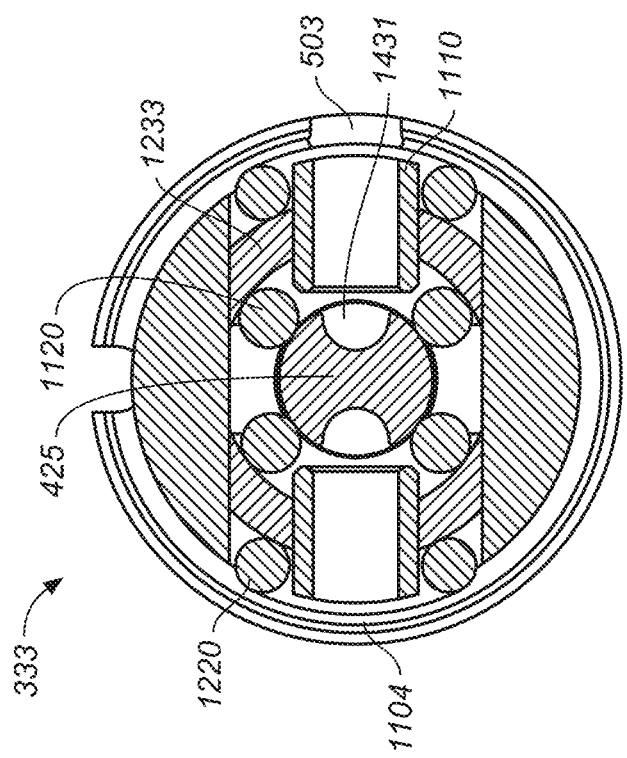
FIG. 14C is a top cross-section perspective view of the dual O-ring rotary flow control valve assembly with a rotating drive shaft having a cylindrical shape and one or more slots therein in a closed state configuration, in accordance with an embodiment.

Referring now to FIG. 14C, a top cross-section perspective view of the dual O-ring rotary flow control valve assembly 333 with a rotating drive shaft 425 having a cylindrical shape and one or more slots 1431 therein is shown in a closed state configuration in accordance with an embodiment. In the closed state, housing 1104 does not rotate, stub shaft 1110 is used to support the at least one O-ring 1120 and 1220 so that they do not collapse under any high pressures from the working fluid. The at least one static O-ring 1220 seals to the ID of the inner fluid chamber 410 and loads through the at least one component 1233 which loads the at least one dynamic O-ring 1120 which creates the dynamic seal between the rotating drive shaft 425 and the seal, and the rotating drive shaft 425 with one or more slots 1431 is rotated to a closed position such that the one or more slots 1431 are not aligned with cross holes 503 thereby stopping the fluid from using the fluid path of flow hole 905 from moving between inner fluid chamber 410 and outer fluid chamber 415 (as shown in FIGS. 4A and 4B).

Figure 14D:
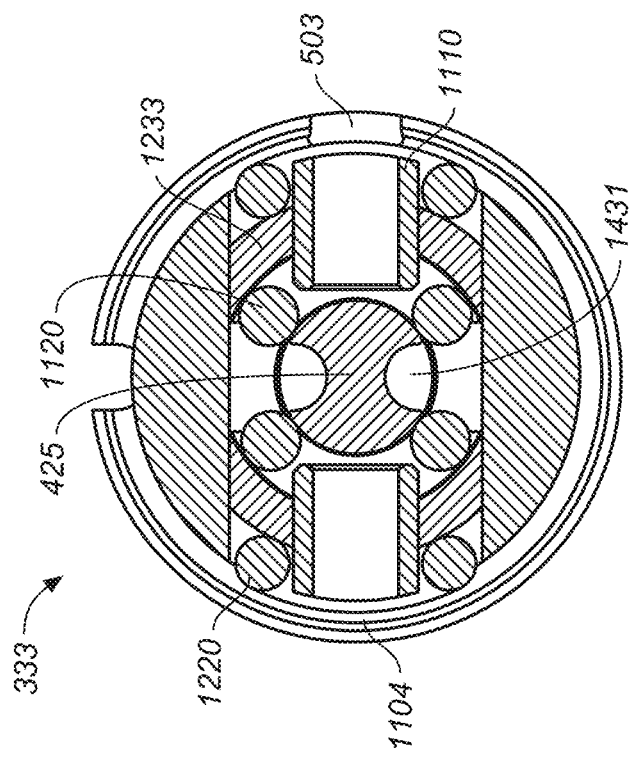
FIG. 14D is a top cross-section view of the dual O-ring rotary flow control valve assembly with a rotating drive shaft having a cylindrical shape and one or more slots therein in an open state configuration, in accordance with an embodiment.

FIG. 14D is a top cross-section view of the dual O-ring rotary flow control valve assembly 333 with a rotating drive shaft having a cylindrical shape and one or more slots 1431 is shown in an open state configuration in accordance with an embodiment. In the open state, housing 1104 still does not rotate, and stub shaft continues to support the at least one O-ring 1120 and 1220 so that they do not collapse under any high pressures from the working fluid. The at least one static O-ring 1220 seals to the ID of the inner fluid chamber 410 and loads through the at least one component 1233 which loads the at least one dynamic O-ring 1120 which creates the dynamic seal between the rotating drive shaft 425 and the seal, and the rotating drive shaft 425 with one or more slots 1431 is rotated to an open position. In the open position, the one or more slots 1431 of rotating drive shaft 425 provide an open fluid flow path between outer fluid chamber 415 and inner fluid chamber 410. In so doing, the fluid can flow from the higher pressure differential to the lower pressure differential between inner fluid chamber 410 and outer fluid chamber 415 through the one or more slots 1431 and cross holes 503.

Communications Protocol

In general, the goal of the disclosed communication protocol is low latency and long battery life. In one embodiment, the network implements the proprietary low-latency low-power radio protocol to provide an effective transport for communication between rotary flow control valve assembly 333 and user interface 205.

In one embodiment, a unique ID is used during the programming/pairing of the rotary flow control valve assembly 333 with the user interface 205. In one embodiment, the unique ID is used by rotary flow control valve assembly 333 to identify a valid user interface 205. In one embodiment, any transmitted signal includes a unique identifier (ID) that identifies the user interface 205 that broadcast the signal. Thus, even when a number of different user interfaces are operating in the same environment, the rotary flow control valve assembly 333 will be able to identify when the signal is sent from the appropriate user interface 205.

In one embodiment, the unique ID, and other data is stored in an erasable programmable read-only memory on a version of rotary flow control valve assembly 333. In one embodiment, the memory can be written to with RF energy, NFC protocols, or the like. As such, the memory could be updated via user interface 205, a mobile device, a laptop, or the like.

In one embodiment, the wireless signal is a "telegram" or the like that includes the unique identifier (ID) that identifies the rotary flow control valve assembly 333 and/or the user interface 205 that broadcast the telegram signal. Thus, even when several electronic and/or mechanically actuated versions of rotary flow control valve assemblies and/or user interfaces are operating in the same environment, the telegram signal will identify which device sent the signal. Although the unique ID is used in one embodiment, in another embodiment, a different portion of the telegram signal is used to identify the transmitting device.

In one embodiment, the telegram signal is sent via a radio frequency (RF) transmitter such as used in a wireless personal area network (WPAN), a low power network (LPN), Internet of things (IoT) connectivity, or the like. In one embodiment, the RF protocol could be, but is not limited to, Bluetooth, WiFi, Bluetooth Low Energy (BLE), near field communication (NFC), UHF radio signal, Worldwide Interoperability for Microwave Access (WiMax), industrial, scientific, and medical (ISM) band, IEEE 802.15.4 standard communicators, Zigbee, ANT, ISA100.11a (wireless systems for industrial automation: process control and related applications) wireless highway addressable remote transducer protocol (HART), MiWi, IPv6 over low-power wireless personal area networks (6LoWPAN), thread network protocol, subnetwork access protocol (SNAP), and the like.

In one embodiment, the rotary flow control valve assembly 333 and/or the user interface 205 transmitter is powered by a momentary generator such as ZF electronics AFIG-0007 or the like. In one embodiment, if the IEEE 802.15.4 standard is utilized, the rotary flow control valve assembly 333 and/or the user interface 205 will include an IEEE 802.2 logical link control sublayer to receive and interpret the signal.

In one embodiment, the communication capabilities of the rotary flow control valve assembly 333 and/or user interface 205 resemble a system such as the ZF Electronics AFIS-5003 with a SNAP transmitter, and the receiving device will have a universal asynchronous receiver/transmitter (UART) interface supporting RS-232 or RS-485 using TTL logic levels to receive and interpret the signal.

In one embodiment, the rotary flow control valve assembly 333 and/or the user interface 205 will periodically send a heartbeat (e.g., check-in message), to inform the other of the rotary flow control valve assembly 333 and/or the user interface 205 that they are still active. In one embodiment, the heartbeat is sent at a 1 Hz communication rate. In one embodiment, the other of the rotary flow control valve assembly 333 and/or the user interface 205 that did not send the heartbeat will provide a response message to confirm that there is a wireless connection therebetween.

In one embodiment, a timer is used by the rotary flow control valve assembly 333 and/or the user interface 205 to count down a check-in or heartbeat time period. In one embodiment, the time period measured by the timer is preset by the manufacturer. In one embodiment, the time period measured by the timer is adjustably set by the manufacturer, by the user, by a mechanic, based on the vehicle location, terrain type, or the like.

In one embodiment, when the timer expires, the heartbeat is sent. In one embodiment, once the wireless connection between the rotary flow control valve assembly 333 and the user interface 205 is confirmed, the timer will be restarted.

In one embodiment, if there is no response to the heartbeat with a predefined period of time, another heartbeat will be sent. In one embodiment, if there is still no response received, an additional pre-defined number of heartbeat signals will be sent.

In one embodiment, a microprocessor on the rotary flow control valve assembly 333 and/or the user interface 205 has a built-in radio capable of standard Bluetooth Low Energy and other communication as part of the ISM Band technologies. In one embodiment, the rotary flow control valve assembly 333 and/or the user interface 205 uses Enhanced Shockburst (ESB). In one embodiment, the microprocessor on the rotary flow control valve assembly 333 and/or the user interface 205 build in radio protocol could be, but is not limited to, WiFi, NFC, UHF radio signal, WiMax, ISM band, an IEEE 802.15.4 standard communicator, Zigbee, ANT, ISA100.11a, wireless HART protocol, MiWi, IPv6, 6LoWPAN, thread network protocol, SNAP, and the like.

In one embodiment, user interface 205 has two wireless radios, e.g., radio 1 and radio 2. In one embodiment, radio 1 handles wireless communication with peripherals where latency and/or battery life is not a concern. For example, radio 1 could communicate with devices such as other controllers, sensors, mobile devices, a power meter, or the like where ~200 msec latency is not a problem. In one embodiment, radio 2 handles the ESB communication and is dedicated to any low latency/low power devices such as rotary flow control valve assembly 333.

In one embodiment, having two operational radios is not that good from a battery life standpoint, but, in one embodiment, the user interface 205 houses a relatively large rechargeable battery. Thus, the expectation for the user interface 205 battery burn time is hours not months.

In one embodiment, rotary flow control valve assembly 333 has a single wireless radio that uses ESB communication and is always listening for a message from the user interface 205. In one embodiment, the amount of power draw from the "always-listening" ESB radio is minimal. However, the always-listening is key for low latency communication.

For example, when the user interface 205 has a message to send to rotary flow control valve assembly 333, it can be nearly instantaneously received by rotary flow control valve assembly 333 (or within 2 msec). In one embodiment, it can be received so quickly because the rotary flow control valve assembly 333 does not have to wake up and try to bond with the user interface 205 (a strategy normally employed to conserve battery life). It is already awake and ready.

In one embodiment, the initial operation of the wireless communication protocol is to pair the rotary flow control valve assembly 333 to the user interface 205. In one embodiment, the wireless communication pairing is made resistant against attempts made by unauthorized actors trying to attack and control the system by performing authentication and encryption between the wireless components. In general, examples of system attacks include, but are not limited to, replay attacks, impersonation, denial of service, and the like.

In one embodiment, replay attacks refers to actions such as, but not limited to, an attacker recording one or more of the messages and playing them back to the device which mistakenly interprets them as valid messages from the sensor(s).

In one embodiment, impersonation refers to actions such as, but not limited to, an attacker pretending to be a sensor, and sending one or more messages directly to the rotary flow control valve assembly 333 and/or the user interface 205.

In one embodiment, denial of service refers to actions such as, but not limited to, an attacker sending one or more specially crafted messages that stop the system from working. Although a number of examples of system attacks are discussed herein, the examples are not exhaustive. In contrast, it is possible, and should be appreciated, that other types of system/communication attacks may be utilized.

In one embodiment, the authentication and encryption between the rotary flow control valve assembly 333 and/or the user interface 205 includes the utilization of AES 128, or the like. For example, in one embodiment, the pairing procedure sets up all state required for the radio protocol to be secure, including the AES-128 symmetric key. Whenever a device—the rotary flow control valve assembly 333 and/or the user interface 205—is turned on, it generates a session-specific 4-byte nonce using a secure random number generator. This nonce is included in all communication between devices.

Within a single session, each device also stores a 4-byte sequence number, that starts at 0, and increments for every transmitted message. The AES-128 block cipher is operated in the Authenticated Encryption with Associated Data (AEAD) scheme, which allows encrypting the given plaintext, and authenticating associated plain text data. The AEAD scheme requires a 13-byte nonce value, referred to herein as AEADNonce. When the AES-128 symmetric key, and AEADNonce are unique for every packet, the connection is secured.

In one embodiment, the AEADNonce is constructed by concatenating the nonce of each device with the sequence number of the particular packet, for a total of 12 bytes, with the 13th byte padded with 00. This ensures the AEADNonce is unique, and the connection is therefore secure. In one embodiment, the application does not accept any packet which it receives that has a sequence number earlier than another packet it has already received. This ensures that replay attacks are not possible. To generate new packets with a valid sequence number, the attacker must know the AES-128 symmetric key.

In one embodiment, to perform this activity, Bluetooth communication (or the like) is used. In one embodiment, to perform this activity, ESB type communications is used. In one embodiment, once the pairing is completed and each component (e.g., the rotary flow control valve assembly 333 and/or the user interface 205) has the keys, any further communications are made via ESB for the fast-communication state. In other words, once the rotary flow control valve assembly 333 is connected to the user interface 205 the ESB protocol (or similar ISM Band Technology) takes over. For example, as discussed herein, the rotary flow control valve assembly 333 and/or the user interface 205 periodically send a heartbeat message (e.g., a check-in) to the other of the rotary flow control valve assembly 333 and/or the user interface 205 to make sure the system is working properly.

In one embodiment, since the rotary flow control valve assembly 333 is always listening for a message from the user interface 205, the rotary flow control valve assembly 333 will receive the message at the speed of the message being sent. In one embodiment, rotary flow control valve assembly 333 will send an acknowledgement message back to the user interface 205. In one embodiment, rotary flow control valve assembly 333 will not send an acknowledgement message back to the user interface 205.

In one embodiment, the communication latency is approximately 2.2 milliseconds. Where, the Accelerometer i2C at 100 kHz is approximately 1000 microseconds, the encryption is approximately 610 microseconds, and the time from the initiation of the transmission from user interface 205 until usable data is received at rotary flow control valve assembly 333 (includes radio time and decryption) is approximately 545 microseconds.

Sometimes a message will not be received properly by the rotary flow control valve assembly 333 and an associated acknowledgement message will not be returned to the user interface 205. In one embodiment, a message resend is then initiated. Each message resend attempt adds an average of 0.5 milliseconds latency. For example, if user interface 205 does not receive an acknowledgement message from the rotary flow control valve assembly 333 within a given amount of time, the user interface 205 sends the message again. For example, assume a 10% chance of message failure. In this case, there is a 10% chance of needing a second message attempt, a 1% chance of needing a 3rd message attempt, and a 0.1% chance of needing a 4th message attempt. Each message attempt adds about 0.5 milliseconds latency, so even a 4th message attempt will be within the "non-user perceptible" latency period.

In one embodiment, one or both of the rotary flow control valve assembly 333 and/or the user interface 205 can be in a number of different energy states to conserve battery life. Although a number of states are discussed, in one embodiment there may be more, fewer, or a different combination or variation of the described energy states. The use of the disclosed energy states is provided herein as one embodiment and for purposes of clarity.

One state is referred to as the operating state. This is the highest battery power consumption state. In the operating state, the rotary flow control valve assembly 333 and/or the user interface 205 is transmitting and/or receiving data.

In a standby state, the rotary flow control valve assembly 333 and/or the user interface 205 are awake and there is a connection therebetween. In the standby state, the user interface 205 is waiting to receive input from the user. When the user provides an input, user interface 205 will move into the operating state and transmit the data to rotary flow control valve assembly 333.

In one embodiment, when rotary flow control valve assembly 333 responds to the transmission from user interface 205, it will be known to both devices that there is a connection therebetween, that the signal has been received by rotary flow control valve assembly 333, and that one or both the rotary flow control valve assembly 333 and/or the user interface 205 can return to the standby state until the next time the user provides an input to user interface 205.

In one embodiment, the rotary flow control valve assembly 333 may not provide a response to the transmission from user interface 205. In one embodiment, user interface 205 may not expect a response from rotary flow control valve assembly 333 after user interface 205 sends the transmission.

In one embodiment, the rotary flow control valve assembly 333 may only provide the heartbeat message to the user interface 205 at pre-defined intervals to evidence the connection between user interface 205 and rotary flow control valve assembly 333.

In one embodiment, if user interface 205 expected but did not receive a response from rotary flow control valve assembly 333, user interface 205 will include a programmed pre-defined number of attempts at transmitting the signal to rotary flow control valve assembly 333 before making the determination that there is a disconnection in the communication between the user interface 205 and the rotary flow control valve assembly 333.

In one embodiment, the pre-defined number of attempts is based on the transmission rate. For example, in one embodiment, it is assumed that it takes 0.5 milliseconds of time for the user interface 205 to transmit a signal to rotary flow control valve assembly 333, for rotary flow control valve assembly 333 to transmit a message received transmission to user interface 205 and also cause motor 450 to rotate rotary flow control valve 420 to an open position thereby activating the dropper seatpost assembly 300.

If the time between the user input occurring (e.g., the user inputting a dropper command to user interface 205) and the movement of the dropper seatpost assembly 300 being noticed by the rider is 1.5 milliseconds, then the pre-defined number of attempts taken by user interface 205 would be 3. Thus, user interface 205 will have tried as many times as possible (e.g., 0.5×3) to send the signal before the lack of dropper seatpost assembly 300 movement was noticed by the rider.

In one embodiment, the number of times the user interface 205 tries could be more or less. The use of three attempts is used herein in one embodiment.

In one embodiment, such as after a period of inaction, or the user interface 205 determines that the bike is not being ridden (e.g., based on a user input, a sensor input, or the like) the user interface 205 will send a standby message to inform rotary flow control valve assembly 333 that the bike is not being ridden. In one embodiment, the rotary flow control valve assembly 333 will transition to a low-power mode or sleep mode when the standby message is received.

In one embodiment, once the rotary flow control valve assembly 333 determines user interface 205 is turned off (or otherwise not responding), rotary flow control valve assembly 333 will enter a no-heartbeat standby state (e.g., an intermediate battery power consumption state), where rotary flow control valve assembly 333 is awake and listening but is not sending any transmissions (e.g., heartbeat transmissions, etc.).

In one embodiment, rotary flow control valve assembly 333 will remain in the no-heartbeat standby state until the connection with user interface 205 is re-established. In one embodiment, when rotary flow control valve assembly 333 receives a message from user interface 205, it will know that the connection with user interface 205 is established (or re-established) and rotary flow control valve assembly 333 will transition from the no-heartbeat standby state to a heartbeat standby state.

In dormant state, the bike is stationary. For instance, the bike is in storage or otherwise parked and not being ridden. In one embodiment, when in dormant state, one or both of the rotary flow control valve assembly 333 and/or the user interface 205 will go into low-power mode. In one embodiment, while in the dormant state, rotary flow control valve assembly 333 will periodically wake up to transmit a signal to user interface 205. If no response is received, rotary flow control valve assembly 333 will return to the dormant state, e.g., go back to sleep.

In contrast, if rotary flow control valve assembly 333 receives a response from user interface 205 during the periodic wakeup, in one embodiment, rotary flow control valve assembly 333 will change from the dormant state into the standby state.

Thus, in one embodiment, the rotary flow control valve assembly 333 and/or the user interface 205 can move between the different states fluidly using the model described above. In one embodiment, the rotary flow control valve assembly 333 and/or the user interface 205 will try to remain in (or return to) the lowest powered state for the specific situation.

In one embodiment, based on the different states described above, the estimate of battery life for a battery used by the rotary flow control valve assembly 333 and the user interface 205 is determined using a duty cycle such as, for example, 2 hours per ride, 4 rides per week, 48 weeks per year.

In one embodiment, the power draw for each state is approximated as an average of 150 microamp draw during the active state, an average of 32 microamp draw during either standby state, and an average of 1 microamp draw during the dormant state.

In one embodiment, the battery is a CR2032 battery. In a CR2032 battery, the capacity is approximately 173 mAh. As such, and based on the power draw for each state and the duty cycle example above, the expected battery life of the battery 339 of the rotary flow control valve assembly 333 and/or the user interface 205 is 23 months. In one embodiment, if the duty cycle is different, the lifespan of the battery will be different.

In one embodiment, a different battery with a different capacity can be used. For example, a smaller (or lighter) battery, a rechargeable battery, or the like. For example, a road bike rider may want a smaller (or lighter) rotary flow control valve assembly 333 as the reduction of weight is one of the most important goals. As such, the rider could use an rotary flow control valve assembly 333 with a smaller battery and therefore swap the battery life (e.g., reduce the battery life from 23 months to a lower life span e.g., a few months, weeks, or the like), in order to obtain a weight savings.

In contrast, an avid mount bike rider may have a harder duty cycle, with more time of the rotary flow control valve assembly 333 and/or the user interface 205 being in operating state, as such, the expected battery life would be reduced by the actual operation of the rotary flow control valve assembly 333 and/or the user interface 205.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A rotary flow control valve comprising:
   a drive mechanism; and
   a rotary flow control valve directly coupled with said drive mechanism, wherein said rotary flow control valve is rotated by said drive mechanism without requiring conversion of a linear motion to a rotational motion, said rotary flow control valve comprising:
     a substantially cylindrical body comprising:
       at least one slot, wherein said at least one slot allows for fluid flow when aligned with a cross hole; and
       at least one sealing portion, wherein said at least one sealing portion prevents fluid flow when aligned with said cross hole, wherein said at least one slot is at a particular angle from said at least one sealing portion, wherein said at least one slot is a first slot and a second slot, wherein said second slot is located 180 degrees from said first slot such that there is a first sealing portion that is located 180 degrees from a second sealing portion;
a first preload pad disposed on said first sealing portion, wherein said first preload pad prevents fluid from leaking past said first sealing portion when said first sealing portion is aligned with said cross hole;
a second preload pad disposed on said second sealing portion, wherein said second preload pad prevents fluid from leaking past said second sealing portion when said second sealing portion is aligned with a second cross hole, wherein said first preload pad and said second preload pad are made of a sealing material; and
a spring disposed between said first preload pad and said second preload pad, said spring used to establish a preload on said first preload pad and said second preload pad.

2. The rotary flow control valve of claim 1 wherein, there is no fluid flow path that goes through said substantially cylindrical body.

3. The rotary flow control valve of claim 1 further comprising: an O-ring seal disposed in a gland on said sealing portion, wherein said O-ring seal prevents fluid from leaking past said sealing portion when said sealing portion is aligned with said cross hole.

4. The rotary flow control valve of claim 1 further comprising: at least one preload pad located on said sealing portion comprising: a sealing material to prevent fluid from leaking past said sealing portion when said sealing portion is aligned with said cross hole; and a compliant material layered behind said sealing material, wherein said compliant material is used to establish a preload on said sealing material.

* * * * *